US011022860B2

(12) United States Patent
Oda

(10) Patent No.: US 11,022,860 B2
(45) Date of Patent: Jun. 1, 2021

(54) IMAGING APPARATUS, METHOD FOR CONTROLLING IMAGING APPARATUS, AND PROCESSING APPARATUS

(71) Applicant: SONY CORPORATION, Tokyo (JP)

(72) Inventor: Katsunari Oda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/495,558

(22) PCT Filed: Apr. 17, 2018

(86) PCT No.: PCT/JP2018/015802
§ 371 (c)(1),
(2) Date: Sep. 19, 2019

(87) PCT Pub. No.: WO2018/194045
PCT Pub. Date: Oct. 25, 2018

(65) Prior Publication Data
US 2020/0041873 A1    Feb. 6, 2020

(30) Foreign Application Priority Data
Apr. 17, 2017   (JP) .............................. JP2017-081529

(51) Int. Cl.
G03B 15/05   (2021.01)
G03B 7/28    (2021.01)
(Continued)

(52) U.S. Cl.
CPC .............. G03B 15/05 (2013.01); G03B 7/28 (2013.01); G03B 17/18 (2013.01); H04N 5/235 (2013.01)

(58) Field of Classification Search
None
See application file for complete search history.

(56) References Cited

U.S. PATENT DOCUMENTS

2005/0213957 A1 * 9/2005 Tokunaga .............. G03B 15/05
                                                              396/61
2009/0208198 A1   8/2009 Khuntia
(Continued)

FOREIGN PATENT DOCUMENTS

JP   2002-207159 A   7/2002
JP   2003-043549 A   2/2003
(Continued)

OTHER PUBLICATIONS

International Search Report and Written Opinion of PCT Application No. No. PCT/JP2015/062712, dated Jul. 10, 2018, 09 pages of ISRWO.

Primary Examiner — William B Perkey
(74) Attorney, Agent, or Firm — Chip Law Group

(57) ABSTRACT

To increase the accuracy of adjusting the main light emission. An amount of main light emission is adjusted on the basis of an estimated pre-light-emitted subject distance or information corresponding to the estimated pre-light-emitted subject distance and an estimated lens-focused subject distance. The estimated pre-light-emitted subject distance and the information corresponding to the estimated pre-light-emitted subject distance are obtained by pre-light-emission processing. The estimated lens-focused subject distance is obtained from focus information through a lens. In a case of bounce light emission, in a case where the estimated pre-light-emitted subject distance is smaller than the estimated lens-focused subject distance, a distance made closer to the estimated lens-focused subject distance from the estimated pre-light-emitted subject distance by a predetermined amount is set as an estimated subject distance for adjusting the main light emission.

19 Claims, 22 Drawing Sheets

(51) Int. Cl.
*G03B 17/18* (2021.01)
*H04N 5/235* (2006.01)

(56) References Cited

U.S. PATENT DOCUMENTS

| | | | |
|---|---|---|---|
| 2010/0322613 A1 | 12/2010 | Khuntia | |
| 2015/0331301 A1 | 11/2015 | Khuntia | |
| 2016/0044242 A1* | 2/2016 | Ono | G03B 15/05 |
| | | | 348/211.6 |
| 2016/0323488 A1* | 11/2016 | Aikawa | H04N 5/23203 |
| 2018/0314137 A1* | 11/2018 | Yoshida | G03B 15/03 |
| 2020/0041873 A1* | 2/2020 | Oda | G03B 15/05 |

FOREIGN PATENT DOCUMENTS

| | | |
|---|---|---|
| JP | 2003-066505 A | 3/2003 |
| JP | 2004-258431 A | 9/2004 |
| JP | 2004-264783 A | 9/2004 |

\* cited by examiner

| AREA NUMBER | | | | | | | | |
|---|---|---|---|---|---|---|---|---|
| 0 | 1 | 2 | 3 | 4 | 5 | 6 | 7 | 8 |
| 9 | 10 | 11 | 12 | 13 | 14 | 15 | 16 | 17 |
| 18 | 19 | 20 | 21 | 22 | 23 | 24 | 25 | 26 |
| 27 | 28 | 29 | 30 | 31 | 32 | 33 | 34 | 35 |
| 36 | 37 | 38 | 39 | 40 | 41 | 42 | 43 | 44 |
| 45 | 46 | 47 | 48 | 49 | 50 | 51 | 52 | 53 |

FIG. 7A

| WEIGHTING COEFFICIENT FOR AREA | | | | | | | | |
|---|---|---|---|---|---|---|---|---|
| a0 | a1 | a2 | a3 | a4 | a5 | a6 | a7 | a8 |
| a9 | a10 | a11 | a12 | a13 | a14 | a15 | a16 | a17 |
| a18 | a19 | a20 | a21 | a22 | a23 | a24 | a25 | a26 |
| a27 | a28 | a29 | a30 | a31 | a32 | a33 | a34 | a35 |
| a36 | a37 | a38 | a39 | a40 | a41 | a42 | a43 | a44 |
| a45 | a46 | a47 | a48 | a49 | a50 | a51 | a52 | a53 |

FIG. 7B

| WEIGHTING COEFFICIENT FOR AREA (EXAMPLE) | | | | | | | | |
|---|---|---|---|---|---|---|---|---|
| 1 | 1 | 1 | 1 | 1 | 1 | 1 | 1 | 1 |
| 1 | 1 | 2 | 2 | 2 | 2 | 2 | 2 | 1 |
| 1 | 2 | 2 | 3 | 3 | 3 | 3 | 2 | 1 |
| 1 | 2 | 3 | 4 | 4 | 4 | 3 | 2 | 1 |
| 1 | 2 | 3 | 4 | 4 | 4 | 3 | 2 | 1 |
| 1 | 2 | 3 | 4 | 4 | 4 | 3 | 2 | 1 |
| 1 | 2 | 2 | 3 | 3 | 3 | 3 | 2 | 1 |
| 1 | 1 | 2 | 2 | 2 | 2 | 2 | 1 | 1 |
| 1 | 1 | 1 | 1 | 1 | 1 | 1 | 1 | 1 |

FIG. 7C

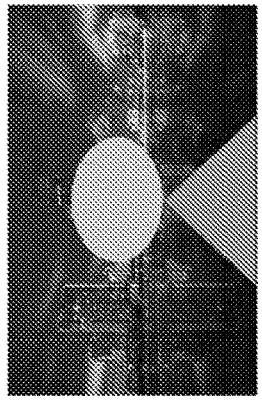

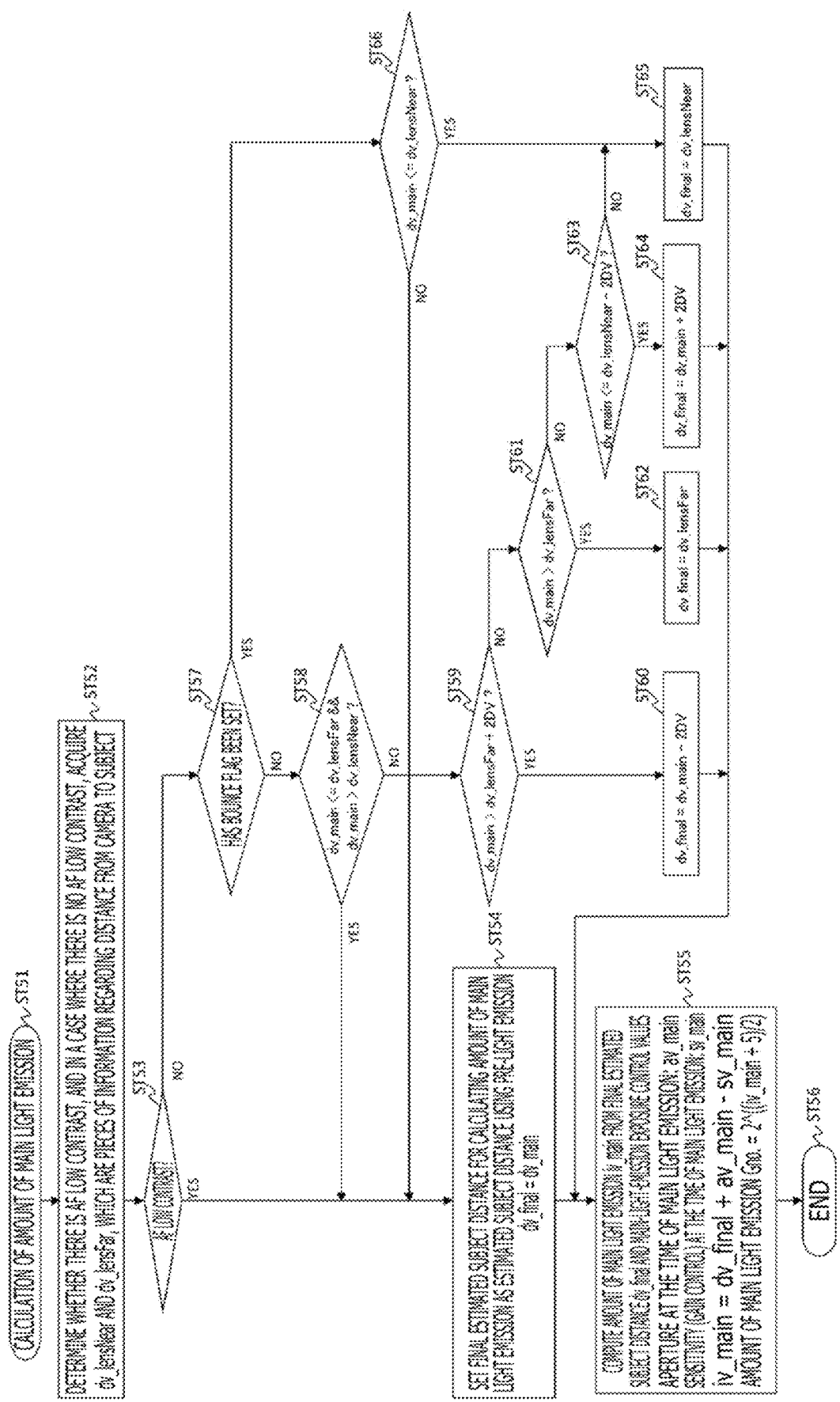

FIG. 20

| Relationship between light distribution angle and attenuation rate | | Flash zoom position for focal length of 16 mm / 74° vertical angle of view | | Flash zoom position for focal length of 35 mm / 38° vertical angle of view | | Flash zoom position for focal length of 70 mm / 20° vertical angle of view | | Flash zoom position for focal length of 105 mm / 13° vertical angle of view | |
|---|---|---|---|---|---|---|---|---|---|
| Vertical angle of view / attenuation angle from optical axis of light-emitting section | | Attenuation rate | Light-distribution-angle correction amount (EV) | Attenuation rate | Light-distribution-angle correction amount (EV) | Attenuation rate | Light-distribution-angle correction amount (EV) | Attenuation rate | Light-distribution-angle correction amount (EV) |
| 90 | | 80% | 2.32 | 100% | 9.97 | 100% | 9.97 | 100% | 9.97 |
| 80 | | 60% | 1.32 | 100% | 9.97 | 100% | 9.97 | 100% | 9.97 |
| 70 | | 40% | 0.74 | 100% | 9.97 | 100% | 9.97 | 100% | 9.97 |
| 60 | | 20% | 0.32 | 70% | 1.74 | 100% | 9.97 | 100% | 9.97 |
| 50 | | 10% | 0.15 | 50% | 1.00 | 60% | 1.32 | 60% | 1.32 |
| 45 | | 5% | 0.07 | 40% | 0.74 | 50% | 1.00 | 50% | 1.00 |
| 40 | | 0% | 0.00 | 30% | 0.51 | 40% | 0.74 | 40% | 0.74 |
| 35 | | 0% | 0.00 | 20% | 0.32 | 30% | 0.51 | 30% | 0.51 |
| 30 | | 0% | 0.00 | 10% | 0.15 | 20% | 0.32 | 20% | 0.32 |
| 25 | | 0% | 0.00 | 5% | 0.07 | 10% | 0.15 | 10% | 0.15 |
| 20 | | 0% | 0.00 | 0% | 0.00 | 5% | 0.07 | 5% | 0.07 |
| 15 | | 0% | 0.00 | 0% | 0.00 | 0% | 0.00 | 0% | 0.00 |
| 10 | | 0% | 0.00 | 0% | 0.00 | 0% | 0.00 | 0% | 0.00 |
| 5 | | 0% | 0.00 | 0% | 0.00 | 0% | 0.00 | 0% | 0.00 |
| 0 | | 0% | 0.00 | 0% | 0.00 | 0% | 0.00 | 0% | 0.00 |
| -5 | | 0% | 0.00 | 0% | 0.00 | 0% | 0.00 | 0% | 0.00 |
| -10 | | 0% | 0.00 | 0% | 0.00 | 0% | 0.00 | 0% | 0.00 |
| -15 | | 0% | 0.00 | 0% | 0.00 | 0% | 0.00 | 0% | 0.00 |
| -20 | | 0% | 0.00 | 0% | 0.00 | 5% | 0.07 | 5% | 0.07 |
| -25 | | 0% | 0.00 | 5% | 0.07 | 10% | 0.15 | 10% | 0.15 |
| -30 | | 0% | 0.00 | 10% | 0.15 | 20% | 0.32 | 20% | 0.32 |
| -35 | | 0% | 0.00 | 20% | 0.32 | 30% | 0.51 | 30% | 0.51 |
| -40 | | 0% | 0.00 | 30% | 0.51 | 40% | 0.74 | 40% | 0.74 |
| -45 | | 5% | 0.07 | 40% | 0.74 | 50% | 1.00 | 50% | 1.00 |
| -50 | | 10% | 0.15 | 50% | 1.00 | 60% | 1.32 | 60% | 1.32 |
| -60 | | 30% | 0.51 | 70% | 1.74 | 100% | 9.97 | 100% | 9.97 |
| -70 | | 40% | 0.74 | 100% | 9.97 | 100% | 9.97 | 100% | 9.97 |
| -80 | | 60% | 1.32 | 100% | 9.97 | 100% | 9.97 | 100% | 9.97 |
| -90 | | 80% | 2.32 | 100% | 9.97 | 100% | 9.97 | 100% | 9.97 |

FIG. 25

| BOUNCE ANGLE° | FLASH ZOOM POSITION FOR FOCAL LENGTH OF 16 mm / 74° VERTICAL ANGLE OF VIEW / 38° VERTICAL ANGLE OF VIEW / MAIN-LIGHT-EMISSION-AMOUNT CONTROL TYPE | FLASH ZOOM POSITION FOR FOCAL LENGTH OF 35 mm / 38° VERTICAL ANGLE OF VIEW / 20° VERTICAL ANGLE OF VIEW / MAIN-LIGHT-EMISSION-AMOUNT CONTROL TYPE | FLASH ZOOM POSITION FOR FOCAL LENGTH OF 70 mm / 20° VERTICAL ANGLE OF VIEW / MAIN-LIGHT-EMISSION-AMOUNT CONTROL TYPE | FLASH ZOOM POSITION FOR FOCAL LENGTH OF 105 mm / 13° VERTICAL ANGLE OF VIEW / MAIN-LIGHT-EMISSION-AMOUNT CONTROL TYPE |
|---|---|---|---|---|
| 0 | (1) | (1) | (1) | (1) |
| 30 | (1) | (2) | (2) | (2) |
| 45 | (2) | (2) | (3) | (3) |
| 60 | (2) | (3) | (3) | (3) |
| 80 | (2) | (3) | (3) | (3) |
| 90 | (3) | (3) | (3) | (3) |
| >90° | (3) | (3) | (3) | (3) |

IMAGING APPARATUS, METHOD FOR CONTROLLING IMAGING APPARATUS, AND PROCESSING APPARATUS

CROSS REFERENCE TO RELATED APPLICATIONS

This application is a U.S. National Phase of International Patent Application No. PCT/JP2018/015802 filed on Apr. 17, 2018, which claims priority benefit of Japanese Patent Application No. JP 2017-081529 filed in the Japan Patent Office on Apr. 17, 2017. Each of the above-referenced applications is hereby incorporated herein by reference in its entirety.

TECHNICAL FIELD

The present technology relates to an imaging apparatus, a method for controlling the imaging apparatus, and a processing apparatus, and more particularly, to an imaging apparatus and the like that adjust main light emission on the basis of a result of pre-light emission.

BACKGROUND ART

For example, a flash photographing apparatus is described in PTL 1. The flash photographing apparatus controls the amount of main light emission with photometric values using pre-light emission and distance information received from a distance measurement section.

CITATION LIST

Patent Literature

[PTL 1]
Japanese Patent Laid-Open No. 2004-258431

SUMMARY

Technical Problem

Conventionally, so-called bounce photographing has been known. In the bounce photographing, flash light does not directly strike a subject. Instead, photographing is performed by emitting flash light toward a ceiling, a wall surface, or the like such that the light reflected off the ceiling, the wall surface, or the like strikes the subject. In this case, the optical path is longer than the distance indicated by distance information.

Conventionally, therefore, when bounce photographing is performed, the amount of main light emission is controlled on the basis of the estimated subject distance using the pre-light emission without using the distance information. However, the estimated subject distance using the pre-light emission is significantly influenced by the level of the reflectance of the subject. For example, in a case where the reflectance of the subject is extremely high, the result is sometimes such that the estimated subject distance using the pre-light emission becomes smaller than the distance indicated by the distance information received from the distance measurement section even at the time of bounce photographing. In a case where the amount of main light emission is controlled only by the estimated subject distance using the pre-light emission, the underexposure may occur.

It is an object of the present technology to increase the accuracy of adjusting the main light emission.

Solution to Problem

A concept of the present technology lies in an imaging apparatus (processing apparatus) including a control section configured to adjust, in a case of bounce light emission, an amount of main light emission on the basis of an estimated pre-light-emitted subject distance or information corresponding to the estimated pre-light-emitted subject distance and an estimated lens-focused subject distance, the estimated pre-light-emitted subject distance and the information corresponding to the estimated pre-light-emitted subject distance being obtained by pre-light-emission processing, the estimated lens-focused subject distance being obtained from focus information through a lens.

In the present technology, an estimated pre-light-emitted subject distance or information corresponding to the estimated pre-light-emitted subject distance is obtained by pre-light-emission processing. An estimated lens-focused subject distance is obtained from focus information through a lens. Further, an amount of main light emission is adjusted on the basis of the estimated pre-light-emitted subject distance or the information corresponding to the estimated pre-light-emitted subject distance and the estimated lens-focused subject distance.

For example, near-side lens error information may be reflected in the estimated lens-focused subject distance. In addition, for example, in a case where the estimated pre-light-emitted subject distance is greater than the estimated lens-focused subject distance, the control section may adjust the amount of main light emission for the case of the bounce light emission without using the estimated lens-focused subject distance. In addition, for example, the control section may obtain an estimated subject distance for adjusting the main light emission on the basis of the estimated pre-light-emitted subject distance or the information corresponding to the estimated light-emitted subject distance and the estimated lens-focused subject distance and adjust the amount of main light emission on the basis of the estimated subject distance for adjusting light.

For example, in a case where the estimated pre-light-emitted subject distance is smaller than the estimated lens-focused subject distance, the control section may set, as the final estimated subject distance, a distance made closer to the estimated lens-focused subject distance from the estimated pre-light-emitted subject distance by a predetermined amount. In this case, for example, the control section may set the estimated lens-focused subject distance as the estimated subject distance for adjusting the main light emission. In addition, in this case, for example, in a case where the estimated pre-light-emitted subject distance is smaller than the estimated lens-focused subject distance by a certain amount or greater, the control section may set, as the estimated subject distance for adjusting the main light emission, a distance increased from the estimated pre-light-emitted subject distance by up to the certain amount.

For example, the control section may acquire, from a lens apparatus, information regarding the estimated lens-focused subject distance in which the near-side lens error information is reflected. In addition, for example, the control section may acquire the near-side lens error information from a lens apparatus and obtain information regarding the estimated lens-focused subject distance in which the near-side lens error information is reflected.

In addition, for example, a holding section configured to hold the near-side lens error information may be further included. The control section may acquire the near-side lens error information from the holding section and obtain information regarding the estimated lens-focused subject distance in which the near-side lens error information is reflected. In this case, for example, a communication section configured to acquire the near-side lens error information from an external server and hold the near-side lens error information in the holding section may be further included. In addition, in this case, for example, a user operation section configured to input the near-side lens error information and hold the near-side lens error information in the holding section may be further included.

In the present technology, as described above, in the case of the bounce light emission, the amount of main light emission is adjusted on the basis of the estimated pre-light-emitted subject distance or the information corresponding to the estimated pre-light-emitted subject distance and the estimated lens-focused subject distance. Therefore, it is possible to increase the accuracy of adjusting the main light emission when the bounce light emission is performed.

It is noted that in the present technology, for example, in a state where a light-emitting section is fixed to a housing of the imaging apparatus, the control section may adjust, in the case of the bounce light emission, the amount of main light emission on the basis of the estimated pre-light-emitted subject distance and the estimated lens-focused subject distance. With this configuration, in a case where the optical path is shorter than the estimated lens-focused subject distance generated on the basis of the focus information, it is possible to prevent a decrease in the accuracy of adjusting the main light emission due to the use of the estimated lens-focused subject distance.

In addition, in the present technology, for example, the control section may correct the estimated pre-light-emitted subject distance on the basis of information regarding an orientation of a light-emitting section. With this configuration, it is possible to obtain the estimated pre-light-emitted subject distance more appropriately and further increase the accuracy of adjusting the main light emission for the case of bouncing.

In this case, for example, the control section may obtain a correction amount of the estimated pre-light-emitted subject distance on the basis of a light-emission attenuation rate corresponding to the information regarding the orientation of the light-emitting section. Further, in this case, for example, the control section may acquire, from the light-emitting section, information regarding the light-emission attenuation rate corresponding to the information regarding the orientation of the light-emitting section. In addition, in this case, for example, a holding section configured to hold the light-emission attenuation rate corresponding to the information regarding the orientation of the light-emitting section may be further included. The control section may acquire, from the holding section, information regarding the light-emission attenuation rate corresponding to the information regarding the orientation of the light-emitting section.

In addition, another concept of the present technology includes a control section configured to control: processing of obtaining an estimated pre-light-emitted subject distance obtained by pre-light-emission processing; processing of obtaining an estimated near-side subject distance in which near-side lens error information is reflected and an estimated near-side subject distance in which far-side lens error information is reflected, the estimated near-side subject distances being obtained from focus information through a lens; processing of correcting the estimated pre-light-emitted subject distance on the basis of information regarding an orientation of a light-emitting section; and processing of adjusting an amount of main light emission on the basis of the estimated pre-light-emitted subject distance corrected, the estimated near-side subject distance, and an estimated far-side subject distance.

In the present technology, an estimated pre-light-emitted subject distance is obtained by pre-light-emission processing. An estimated near-side subject distance in which near-side lens error information is reflected and an estimated near-side subject distance in which far-side lens error information is reflected are obtained from focus information through a lens. The estimated pre-light-emitted subject distance is corrected on the basis of information regarding an orientation of a light-emitting section. Further, an amount of main light emission is adjusted on the basis of the estimated pre-light-emitted subject distance corrected, the estimated near-side subject distance, and an estimated far-side subject distance.

For example, the control section may obtain a correction amount of the estimated pre-light-emitted subject distance on the basis of a light-emission attenuation rate corresponding to the information regarding the orientation of the light-emitting section. In this case, for example, the control section may acquire, from the light-emitting section, information regarding the light-emission attenuation rate corresponding to the information regarding the orientation of the light-emitting section. In addition, in this case, for example, a holding section configured to hold the light-emission attenuation rate corresponding to the information regarding the orientation of the light-emitting section may be further included. The control section may acquire, from the holding section, information regarding the light-emission attenuation rate corresponding to the information regarding the orientation of the light-emitting section.

In the present technology, as described above, the estimated pre-light-emitted subject distance is corrected and used according to the information regarding the orientation of the light-emitting section. It is possible to obtain the estimated pre-light-emitted subject distance more appropriately and increase the accuracy of adjusting the main light emission.

Advantageous Effect of Invention

According to the present technology, it is possible to increase the accuracy of adjusting the main light emission. It is noted that the effects described in the present specification are merely examples and are not limitative. In addition, additional effects may be exhibited.

BRIEF DESCRIPTION OF DRAWINGS

FIGS. 7A, 7B, and 7C depict diagrams for describing a configuration and operation of a photometry section.

FIGS. 8A, 8B, 8C, 8D, 8E, 8F, 8G, 8H, and 8I depict diagrams for describing the configuration and operation of the photometry section.

FIG. 9 is a flowchart illustrating an example of control processing of calculation of the amount of main light emission.

FIG. 20 is a diagram illustrating a light-emission-amount attenuation rate for each of the angular directions in the light distribution angles of 0 to 90 degrees in the vertical direction according to respective flash zoom positions.

FIG. 25 is a diagram illustrating an example of combinations for switching a main-light-emission control type according to a relationship between respective flash zoom positions and flash bounce angles.

DESCRIPTION OF EMBODIMENTS

Hereinafter, a mode for carrying out the invention (hereinafter referred to as "embodiment") will be described. It is noted that the description will be made in the following order.

1. Embodiment
2. Modification

1. Embodiment

[Example of Configuration of Imaging System]

Figure 1:
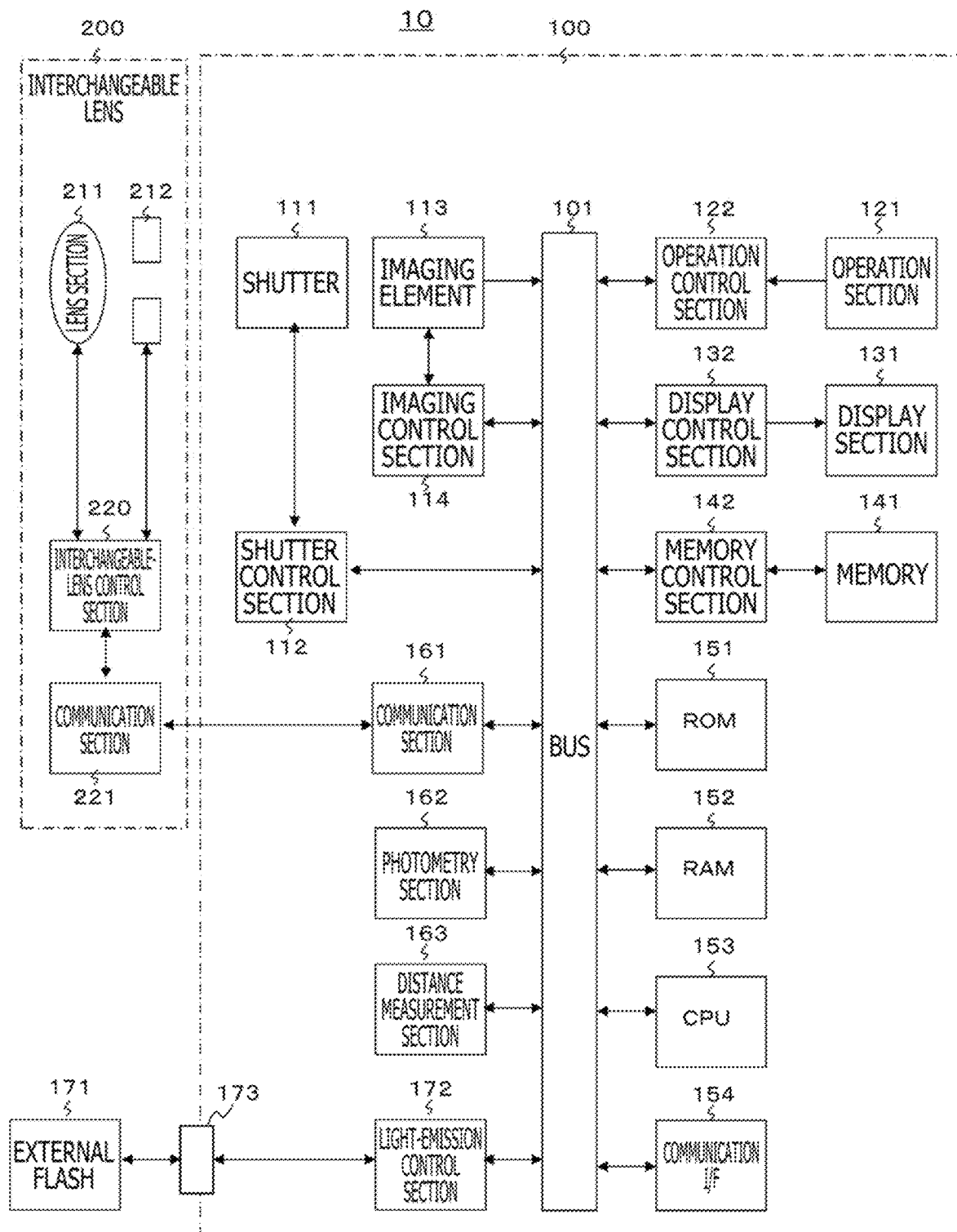
FIG. 1 is a block diagram illustrating an example of a configuration of an imaging system as an embodiment.

FIG. 1 illustrates an example of a configuration of an imaging system 10 as the embodiment. The imaging system 10 includes an imaging apparatus 100 and an interchangeable lens 200. The imaging system 10 is implemented by, for example, a digital still camera (for example, a digital single-lens camera) whose lens is replaceable.

The imaging apparatus 100 is an imaging apparatus that captures an image of a subject to generate image data (a captured image) and record the generated image data as image content (still image content or moving image content). In addition, the interchangeable lens 200 can be mounted on the imaging apparatus 100 through a lens mount (not illustrated).

The interchangeable lens 200 is an interchangeable lens unit that can be mounted on the imaging apparatus 100 through the lens mount (not illustrated). The interchangeable lens 200 includes a lens section 211, an aperture 212, an interchangeable-lens control section 220, and a communication section 221.

The imaging apparatus 100 includes a bus 101, a shutter 111, a shutter control section 112, an imaging element 113, an imaging control section 114, an operation section 121, an operation control section 122, a display section 131, and a display control section 132. In addition, the imaging apparatus 100 includes a memory 141, a memory control section 142, a ROM (Read Only Memory) 151, and a RAM (Random Access Memory) 152.

In addition, the imaging apparatus 100 includes a CPU (Central Processing Unit) 153 and a communication interface 154. In addition, the imaging apparatus 100 includes a communication section 161, a photometry section 162, a distance measurement section 163, an external flash 171, a light-emission control section 172, and a connection section 173. It is noted that the bus 101 is a system bus. The respective sections included in the imaging apparatus 100 are connected so to be communicable with each other through the bus 101.

The lens section 211 is a group of lenses that collect light incident from the subject. The light collected by the group of lenses is incident on the imaging element 113. It is noted that the lens section 211 includes a focus lens for focusing, a zoom lens for enlarging the subject, and the like. In addition, each lens included in the lens section 211 is controlled by the interchangeable-lens control section 220 such that a zoom function, a focus function, and the like are realized.

The communication section 221 communicates with the communication section 161 of the imaging apparatus 100. The communication section 221 receives request information from the imaging apparatus 100 and transmits the request information to the interchangeable-lens control section 220. The interchangeable-lens control section 220 controls the lens section 211 and the aperture 212 on the basis of a drive request included in the request information. In addition, state information indicating the position of each lens of the lens section 211 and the state of the aperture 212 transmitted from the communication section 221 and the interchangeable-lens control section 220 is transmitted to the imaging apparatus 100.

The aperture 212 adjusts the amount of incident light that passes through the lens section 211. The light that has been adjusted by the aperture 212 is incident on the imaging element 113. In addition, the aperture 212 is controlled by the interchangeable-lens control section 220.

The shutter 111 physically blocks light to be incident on the imaging element 113 on the basis of the control by the shutter control section 112. That is, the shutter 111 adjusts the amount of light by passing or blocking light to be incident on the imaging element 113. It is noted that although an example described herein uses the shutter that physically blocks light to be incident on the imaging element 113, an electronic shutter that can realize the function equivalent to this shutter may be used. The shutter control section 112 controls the shutter 111 on the basis of the control by the CPU 153.

On the basis of the control by the imaging control section 114, the imaging element 113 converts, for each pixel, an optical image (subject image) of the subject, which has been formed on a light receiving surface by light incident through the lens section 211 and the aperture 212, into electrical signals and outputs image signals (image data) for one screen. The image signals output from the imaging element 113 are subjected to various types of image processing through the bus 101.

In addition, the image signals output from the imaging element 113 are used to perform various types of computational processing. Examples of the computational processing to be performed include AF (Auto Focus) computational processing, AE (Automatic Exposure) computational processing, and AWB (Auto White Balance) computational processing.

It is noted that as long as all or part of the image data accumulated in the imaging element can be read on the basis of the control by the imaging control section 114, various types of configurations can be used as accumulation and reading configurations for the imaging element. In addition, a CCD (Charge Coupled Device) sensor, a CMOS (Complementary Metal Oxide Semiconductor) sensor, or the like can be used as the imaging element 113, for example.

The imaging control section 114 controls imaging processing and output processing of the imaging element 113 on the basis of the control by the CPU 153. Specifically, the imaging control section 114 generates timing signals for performing imaging control (for example, drive timing signals necessary when the imaging element 113 accumulates and reads image signals for each screen) and supplies the generated timing signals to the imaging element 113. When various types of timing signals are supplied to the imaging element 113, the imaging element 113 uses the timing signals as timing signals for the imaging processing and the processing of outputting the image signals.

The operation section 121 includes operation members such as buttons for performing various types of operations and receives an operation input from a user. On the basis of the control by the CPU 153, the operation control section 122 performs control related to the operation input received by the operation section 121.

The content of the operation input received by the operation section 121 is transmitted to the CPU 153 through the operation control section 122. The operation section 121 is an interface for reflecting a request from the user in the imaging apparatus 100. It is noted that in addition to the operation members such as the buttons arranged on the outer surface of the imaging apparatus 100, a touch panel may be provided on the display section 131 to receive an operation input from the user on the touch panel.

The display section 131 displays images corresponding to various types of image data supplied from the display control section 132. The display control section 132 causes the display section 131 to display various types of image data on the basis of the control by the CPU 153. In addition, the display section 131 provides, together with an image to be displayed, information and the like associated with the image. For example, the display section 131 sequentially displays the image data (captured image) output from the imaging element 113 and subjected to various types of image processing.

In addition, the display section 131 displays an image corresponding to an image file stored in the memory 141, for example. It is noted that a display panel such as an organic EL (Electro Luminescence) panel or an LCD (Liquid Crystal Display) can be used as the display section 131, for example. In addition, a touch panel may be used, for example. On the touch panel, the user can perform an operation input by touching or approaching the user's finger on the display surface.

The memory 141 is a non-volatile storage apparatus that records image data and the like on the basis of the control by the memory control section 142. The memory control section 142 performs memory control such as reading of data from the memory 141 and writing of data to the memory 141 on the basis of the control by the CPU 170.

The image data output from the imaging element 113 and subjected to various types of image processing are recorded on the memory 141 as an image file (a still image file or a moving image file). It is noted that the memory 141 may be detachable from the imaging apparatus 100 or may be fixed or built in the imaging apparatus 100. In addition, another storage medium such as a semiconductor memory, a magnetic disk, an optical disc, or the like can be used as the memory 141, for example.

The ROM 151 is a non-volatile memory that stores a program to be executed by the CPU 153, software, data, and the like. The RAM 152 is a volatile memory that holds data that should be temporarily held and data that are rewritable when the CPU 153 operates.

The CPU 153 controls each section of the imaging apparatus 100 on the basis of the program, software, and the like stored in the ROM 151. That is, the CPU 153 executes the program, software, and the like to collectively control components that are communicable through the bus 101.

The communication interface (communication I/F) 154 transmits or receives information by communicating with an external device, for example, a personal computer connected through a digital interface or an external server connected through a network. For example, the communication interface 154 can transmit an image file recorded on the memory 141 to the server on the network for storage. In addition, for example, the communication interface 154 can access the server on the network to acquire an update program or other information necessary for the CPU 153 to control the imaging apparatus 100.

The photometry section 162 receives part of the light incident through the lens section 211 and the aperture 212. The photometry section 162 generates a photometric signal related to the luminosity on the subject side, that is, the subject brightness, and transmits the photometric signal to the CPU 152. For example, the photometry section 162 includes a photometric sensor whose light receiving section is divided into a plurality of photometric areas. An optical image for the subject is divided into the plurality of photometric areas, and photometric values are individually obtained in the respective photometric areas.

The distance measurement section 163 computes an estimated subject distance on the basis of focus lens position information (focus information) transmitted from the interchangeable lens 200 by communication, and transmits the estimated subject distance to the CPU 151. The estimated subject distance indicates the distance from the imaging apparatus 100 to the subject. It is noted that in a case where information regarding the above-described estimated subject distance is transmitted from the interchangeable lens 200 by communication, the computation of the estimated subject distance in the distance measurement section 163 is not necessary. It is noted that in addition to the configuration for obtaining the subject distance by computation on the basis of the focus lens position information (focus information), it is also conceivable that the distance measurement section 163 has a configuration for obtaining the subject distance information using an ultrasonic wave, a laser, or the like.

The external flash 171 is included in an external light-emitting section. For example, the external flash 171 is mounted using the connection section 173 provided on an upper portion of a housing of the imaging apparatus 100 and is provided so as to irradiate the subject with flash light. The external flash 171 is discharge equipment such as, for example, a xenon lamp and can emit strong light only for a moment to irradiate the subject with a strong flash of light. It is noted that a built-in flash is omitted in the example in the figure.

Figure 2A:
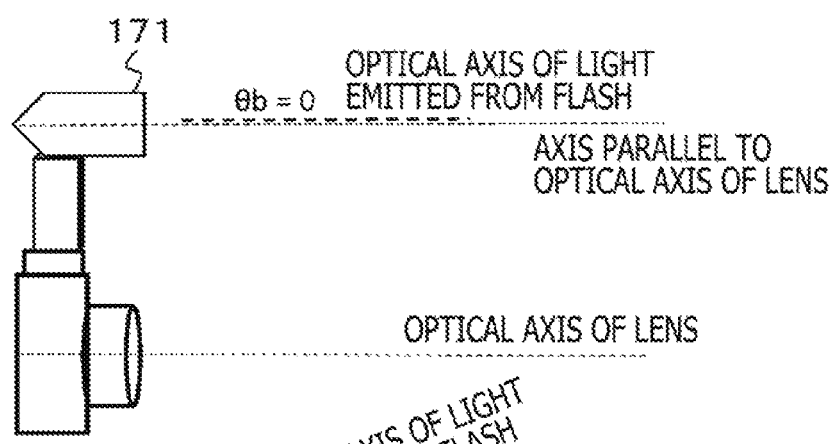
FIGS. 2A and 2B depict diagrams illustrating states of direct irradiation and bounce irradiation.
Figure 2B:
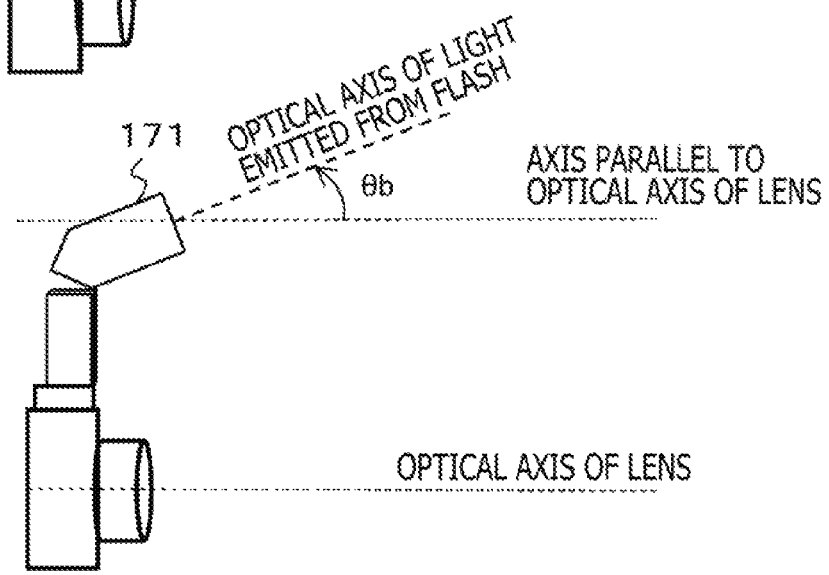

The external flash 171 can change the irradiation direction and selectively perform direct or bounce irradiation as irradiation of an imaging target. FIG. 2A illustrates a state of direct irradiation (direct light emission) where the bounce angle θb is 0 degree. FIG. 2B illustrates a state of bounce irradiation (bounce light emission) where the bounce angle θb is not 0 degree.

The light-emission control section 172 controls the amount of light emission and the light emission timing of the external flash 171 on the basis of the control by the CPU 153. In this embodiment, pre-light emission (preliminary light emission) is performed prior to main light emission for imaging the subject. On the basis of this result, the amount of main light emission is appropriately adjusted.

Figure 3:
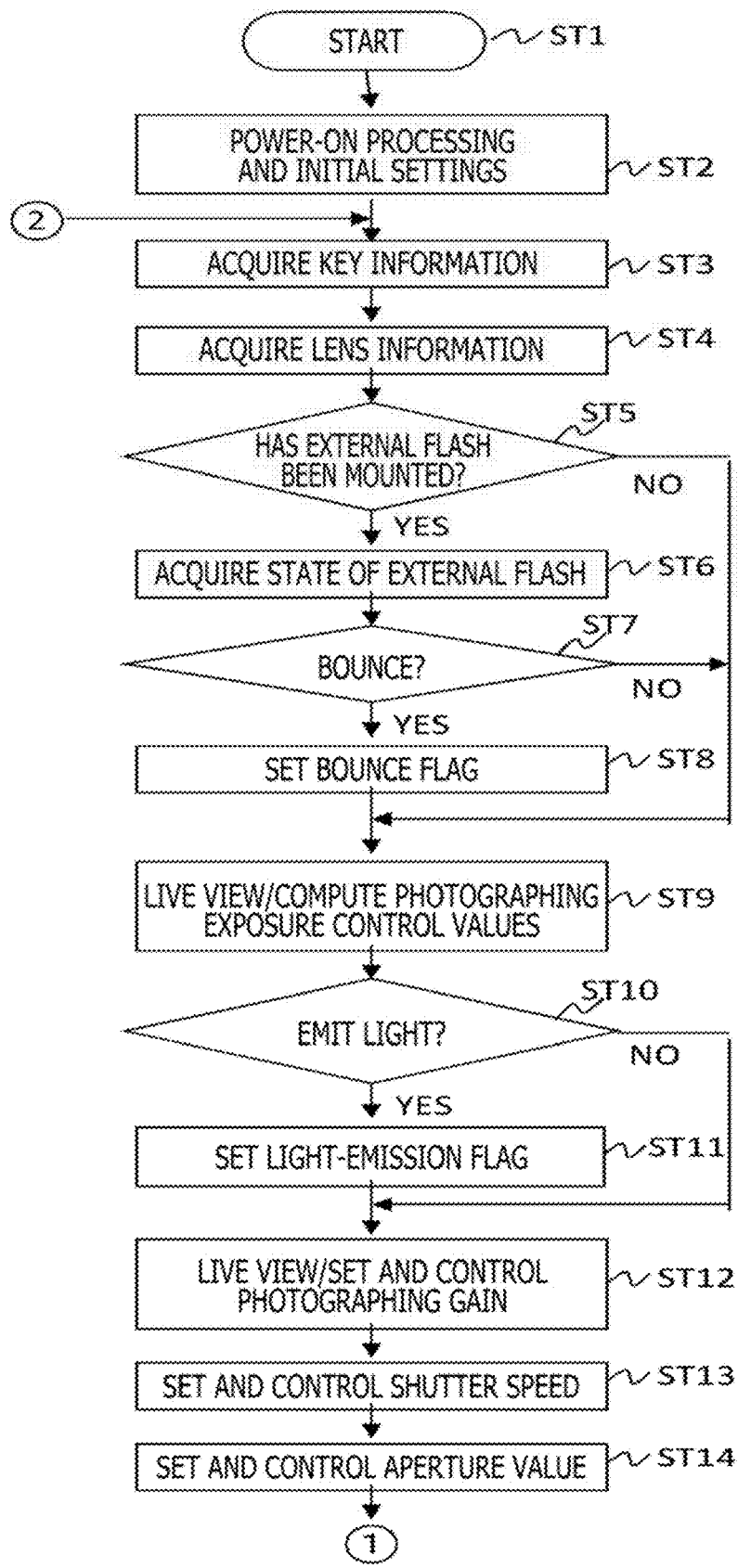
FIG. 3 is a flowchart (1/2) illustrating an example of control processing at the time of photographing.
Figure 4:
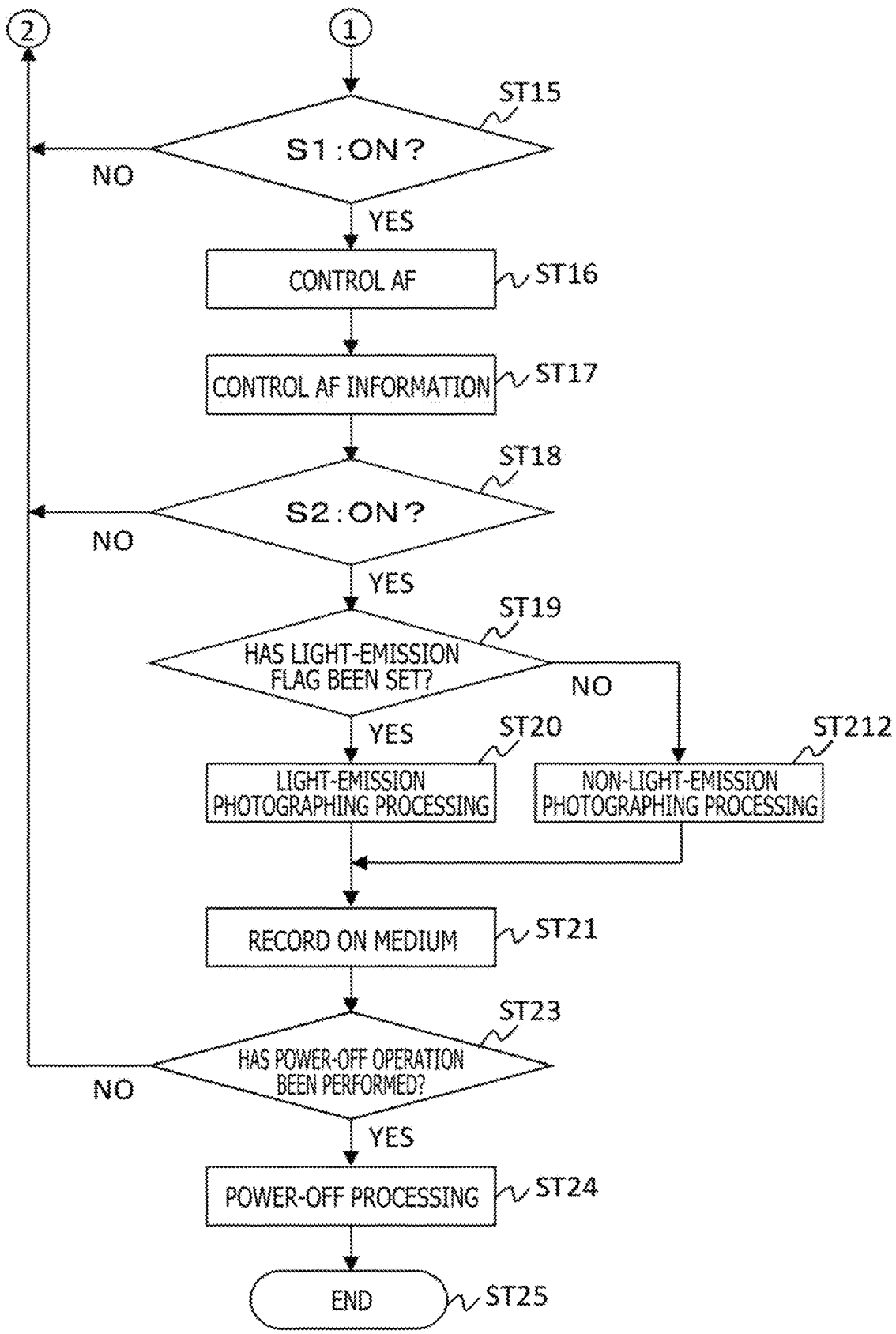
FIG. 4 is a flowchart (2/2) illustrating the example of the control processing at the time of the photographing.

Flowcharts in FIGS. 3 and 4 illustrate an example of control processing in the CPU 153 at the time of photographing. First, the CPU 153 starts the control processing when power is on in step ST1. Next, the CPU 153 performs power-on processing and initial settings in step ST2.

Next, the CPU 153 acquires operation information in step ST3. In this case, the CPU 153 acquires the operation information such as an exposure mode, an exposure correction value, a preview, and AF/MF switching. Next, the CPU 153 acquires lens information such as an aperture and a focal length in step ST4.

Next, in step ST5, the CPU 153 determines whether or not the external flash 171 has been mounted. In a case where the external flash 171 has been mounted, the CPU 153 acquires a state of the external flash 171 in step ST6. The state of the external flash 171 includes information such as on/off of light emission and bouncing.

Next, in step ST7, the CPU 153 determines whether or not the external flash 171 is in a bounce state. The CPU 153 determines whether or not the external flash 171 is in the bounce state on the basis of bounce information acquired from the external flash 171 in step ST6. It is noted that the CPU 153 may perform processing of determining whether or not the external flash 171 faces the subject and in a case where the CPU 153 has determined that the external flash 171 does not face the subject as a result of the processing, the CPU 153 may determine that the external flash 171 is in the bounce state. In a case where the external flash 171 is in the bounce state, the CPU 153 sets a bounce flag in step ST8.

After the processing in step ST8, the CPU 153 proceeds to processing in step ST9. It is noted that in a case where the external flash 171 has not been mounted in step ST5 or the external flash 171 is not in the bounce state in step ST7, the CPU 153 immediately proceeds to processing in step ST9.

In step ST9, the CPU 153 displays a live view on the display section 131 while computing photographing exposure control values. Next, in step ST10, the CPU 153 determines whether or not to emit light. For example, the CPU 153 determines not to emit light in a case where non-light emission has been set. In addition, for example, in a case where automatic light emission has been set and the subject brightness is sufficient according to the photometric signal, the CPU 153 determines not to emit light.

In a case where the CPU 153 has determined to emit light, the CPU 153 sets a light-emission flag in step ST11, and then proceeds to processing in step ST12. On the other hand, in a case where the CPU 153 has determined not to emit light, the CPU 153 immediately proceeds to processing in step ST12 without setting the light-emission flag.

In step ST12, the CPU 153 displays a live view while setting and controlling photographing gain. Next, the CPU 153 sets and controls the shutter speed (SS) in step ST13. Further, the CPU 153 sets and controls an aperture value in step ST14.

Next, in step ST15, the CPU 153 determines whether S1 is on, that is, whether or not a shutter button has been half-pressed. In a case where S1 is not on, the CPU 153 returns to the processing in step ST3. On the other hand, in a case where S1 is on, the CPU 153 performs auto-focus control in step ST16.

Next, the CPU 153 acquires auto-focus information in step ST17. The auto-focus information includes, for example, information regarding the estimated subject distance generated on the basis of in-focus/out-of-focus and the focus information. For example, the information regarding the estimated subject distance is supplied directly to the imaging apparatus 200 from the lens apparatus 200 or calculated by the distance measurement section 163 on the basis of the focus information supplied from the lens apparatus 200 to the imaging apparatus 100.

In addition, for example, in a case where the information regarding the estimated subject distance is supplied from the lens apparatus 200 to the imaging apparatus 100, pieces of information regarding an estimated near-side subject distance and an estimated far-side subject distance or pieces of information regarding near-side and far-side errors are also supplied at the same time. The estimated near-side subject distance includes a near-side error. The estimated far-side subject distance includes a far-side error. In a case where the pieces of information regarding the near-side and far-side errors are supplied, the pieces of information regarding the estimated near-side subject distance including the near-side error and the estimated far-side subject distance including the far-side error are computed and used on the basis of the pieces of information regarding the near-side and far-side errors and the information regarding estimated subject distance.

Next, in step ST18, the CPU 153 determines whether S2 is on, that is, whether or not the shutter button has been deep-pressed. In a case where S2 is not on, the CPU 153 returns to the processing in step ST3. On the other hand, in a case where S2 is on, the CPU 153 proceeds to processing in step ST19.

In step ST19, the CPU 153 determines whether or not the light-emission flag has been set. In a case where the light-emission flag has been set, the CPU 153 performs light-emission photographing processing in step ST20, and then records image data on a medium in step ST21. On the other hand, in a case where the light-emission flag has not been set, the CPU 153 performs non-light-emission photographing processing in step ST22, and then records image data on the medium in step ST21. It is noted that in this embodiment, the medium is the memory 141 (see FIG. 1).

Next, in step ST23, the CPU 153 determines whether or not a power-off operation has been performed. In a case where the power-off operation has not been performed, the CPU 153 returns to the processing in step ST3. On the other hand, in a case where the power-off operation has been performed, the CPU 153 performs power-off processing in step ST24, and then ends the control processing in step ST25.

Figure 5:
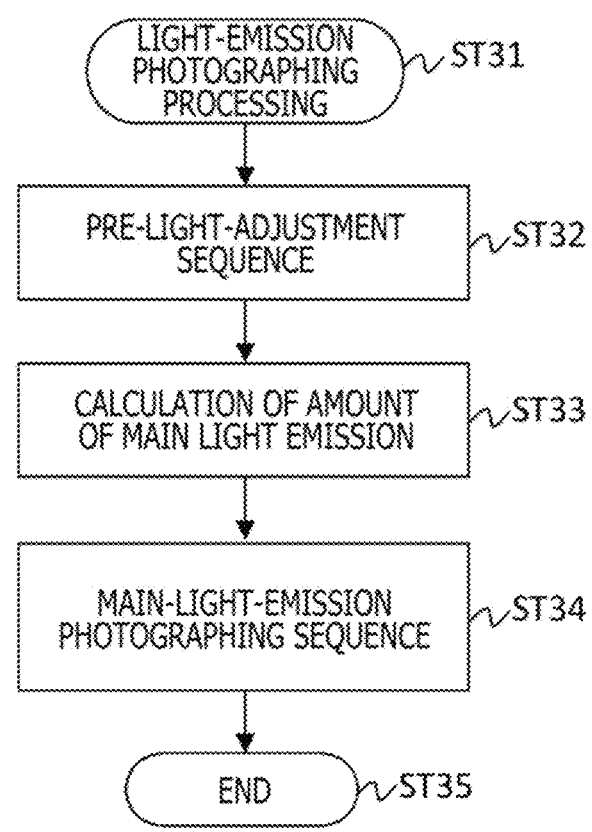
FIG. 5 is a flowchart illustrating an example of control processing of light-emission photographing.

A flowchart in FIG. 5 illustrates an example of control processing of light-emission photographing in the CPU 153. First, the CPU 153 starts the control processing in step ST31. Then, the CPU 153 executes control processing of a pre-light-adjustment sequence in step ST32, and executes control processing of calculation of the amount of main light emission in step ST33. In addition, the CPU 153 executes control processing of a main-light-emission photographing sequence in step ST34. Then, after the processing in step ST34, the CPU 153 ends the control processing in step ST35.

Figure 6:
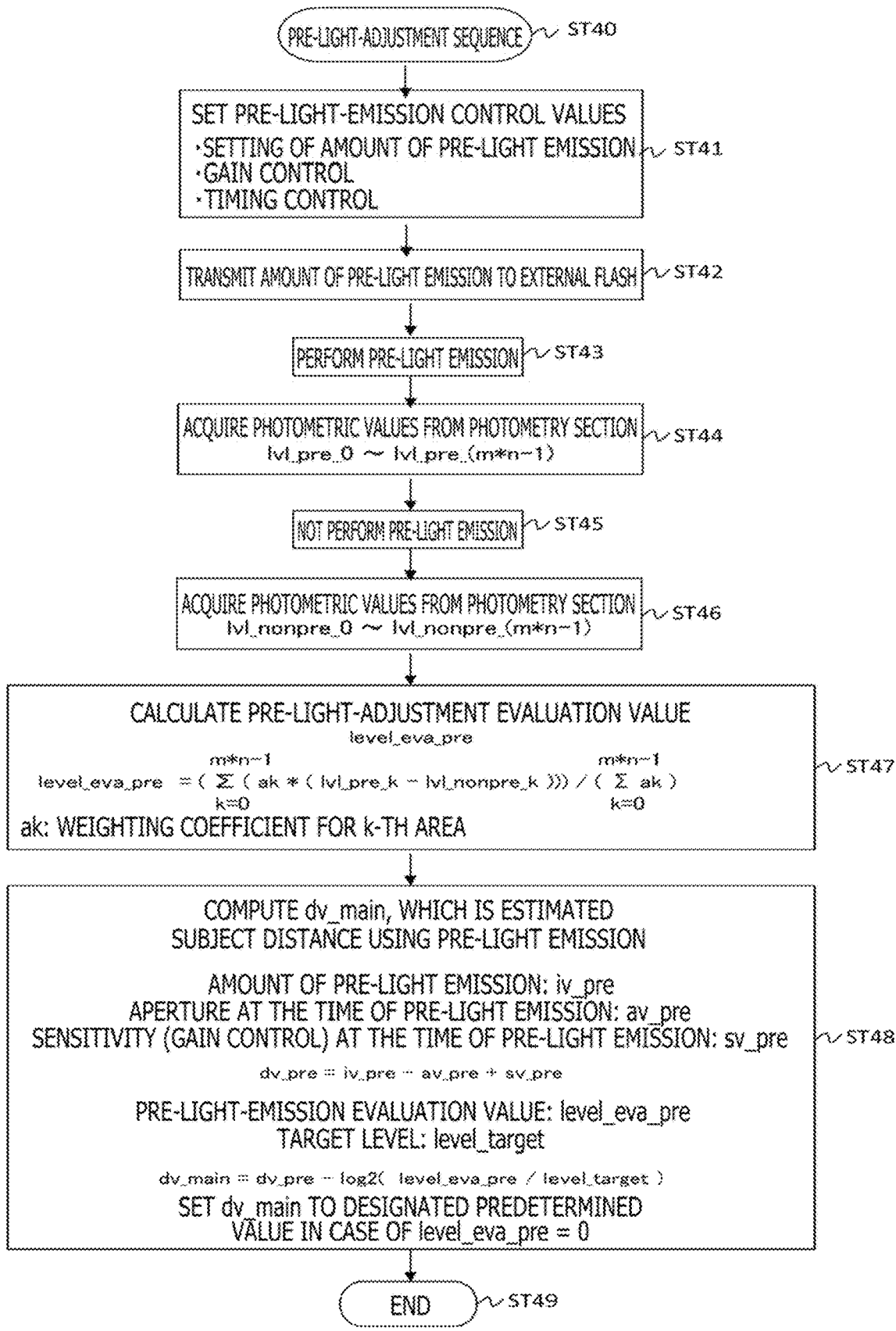
FIG. 6 is a flowchart illustrating an example of control processing of a pre-light-adjustment sequence.

A flowchart in FIG. 6 illustrates an example of the control processing of the pre-light-adjustment sequence in the CPU 153. First, the CPU 153 starts the control processing in step ST40. After that, the CPU 153 sets pre-light-emission control values in step ST41.

In this case, the CPU 153 uses a flash appropriate guide number calculation formula represented by the following mathematical formula (1) to calculate the amount of pre-light emission from the ISO sensitivity, distance information, and aperture information, for example.

[Math. 1]

$$Gno = \frac{Distance \times Aperture}{\sqrt{\frac{ISO\ sensitivity}{100}}} \quad (1)$$

Next, the CPU 153 transmits the amount of pre-light emission from the light-emission control section 172 to the external flash 171 in step ST42 and performs pre-light emission in step ST43 to acquire photometric values from the photometry section 162 in step ST44.

As described above, the photometry section 162 includes the photometric sensor whose light receiving section is divided into the plurality of photometric areas. An optical image for the subject is divided into the plurality of photometric areas, and photometric values are individually obtained in the respective photometric areas. In a case where there is a plurality of photometric areas separated in a matrix of m×n, m×n photometric values lvl_pre_0 to lvl_pre_(m*n−1) are obtained. Here, each of 0 to m*n−1 denotes a number of each of the photometric areas. For example, FIG. 7A illustrates an example in which the photometry section 162 includes 9×6=54 photometric areas that are each assigned an area number from 0 to 53.

Next, returning to FIG. 6, the CPU 153 acquires photometric values from the photometry section 162 in step ST46 without performing pre-light emission in step ST45. In a case where there is a plurality of photometric areas separated in a matrix of m×n, m×n photometric values lvl_nonpre_0 to lvl_nonpre_(m*n−1) are obtained.

Next, in step 47, the CPU 153 calculates a pre-light-adjustment evaluation value level_eva_pre by subtracting the photometric value at the time of non-light emission from the photometric value at the time of light emission for each photometric area and weighting and adding each resulting value. The following mathematical formula (2) represents a formula for calculating the pre-light-adjustment evaluation value level_eva_pre. A weighting coefficient for the k-th area is denoted by ak.

[Math. 2]

$$level\_eva\_pre = \left(\sum_{k=0}^{m*n-1}(ak*(lvl\_pre\_k - lvl\_nonpre\_k))\right) \Big/ \left(\sum_{k=0}^{m*n-1}ak\right) \quad (2)$$

FIG. 7B illustrates weighting coefficients a0 to a53 set in advance in a case where the photometry section 162 includes, as illustrated in FIG. 7A, the 54 photometric areas denoted by the area numbers 0 to 53. The weighting coefficients a0 to a53 correspond to the respective photometric areas. FIG. 7C illustrates a specific example of the weighting coefficients a0 to a53.

Next, in step ST48, the CPU 153 computes dv_main, which is an estimated subject distance using the pre-light emission. In this case, in a case where the amount of pre-light emission is assumed to be iv_pre, the aperture at the time of the pre-light emission is assumed to be av_pre, and the sensitivity (gain control) at the time of the pre-light emission is assumed to be sv_pre, a distance dv_pre (Apex), which is appropriate for the amount of pre-light emission, is obtained by the following mathematical formula (3).

$$dv\_pre = iv\_pre - av\_pre + sv\_pre \quad (3)$$

The estimated subject distance using the pre-light emission dv_main is computed by the following mathematical formula (4) using the pre-light-adjustment evaluation value level_eva_pre calculated in step ST47, dv_pre obtained by the mathematical formula (3), and a target level level_target. It is noted that dv_main is set to a designated predetermined value in the case of level_eva_pre=0.

$$dv\_main = dv\_pre - \log 2(level\_eva\_pre/level\_target) \quad (4)$$

After the processing in step ST48, the CPU 153 ends the control processing in step ST49.

Here, specific examples of calculation of the pre-light-emission evaluation value level_eva_pre and the estimated subject distance using the pre-light emission dv_main will be described. First, the pre-light-emission evaluation value level_eva_pre will be described with reference to FIGS. 8A, 8B, 8C, 8D, 8E, 8F, 8G, 8H, and 8I. FIG. 8A illustrates a live view. In addition, FIG. 8B illustrates an exposure state at the timing of the non-pre-light emission. FIG. 8C illustrates a detected value (photometric value) in each photometric area in the exposure state.

FIG. 8D illustrates an exposure state at the timing of the pre-light emission. FIG. 8E illustrates a detected value (photometric value) in each photometric area in the exposure state. FIG. 8F illustrates a detected state. As illustrated in FIG. 8G, each photometric value at the timing of the non-pre-light emission is subtracted from the corresponding photometric value at the timing of the pre-light emission to obtain a difference value for each photometric area.

FIG. 8H illustrates the weighting coefficient ak for each photometric area. FIG. 8I illustrates the values each obtained by multiplying the difference value of each photometric area by the corresponding weighting coefficient ak. Therefore, in this specific example, the pre-light-emission evaluation value level_eva_pre is calculated as 14, as represented by the mathematical formula (5).

[Math. 3]

$$\text{level\_eva\_pre} = \left( \sum_{k=0}^{m*n-1} (ak * (\text{lvl\_pre\_k} - \text{lvl\_nonpre\_k})) \right) \bigg/ \left( \sum_{k=0}^{m*n-1} ak \right) \quad (5)$$
$$= 808/57$$
$$= 14$$

Next, the estimated subject distance using the pre-light emission dv_main will be described. For example, the Apex value of each control value is assumed to be as follows.

Amount of pre-light emission: iv_pre
Gno.2.0->iv_pre=−3
Aperture at the time of the pre-light emission: av_pre
Fno.4.0->av_pre=4
Sensitivity (gain control) at the time of the pre-light emission: sv_pre
ISO400->sv_pre=7

The distance dv_pre (Apex), which is appropriate for the amount of pre-light emission, is calculated from each control value, as represented by the following mathematical formula (6).

$$dv\_\text{pre} = iv\_\text{pre} - av\_\text{pre} + sv\_\text{pre} = -3 - 4 + 7 = 0 \quad (6)$$

As described above, the pre-light-emission evaluation value level_eva_pre is assumed to be calculated as 14. In addition, the target level level_target is assumed to be, for example, 40. The target level is a target exposure value, and the amount of main light emission is determined so as to reach this exposure value.

Pre-light-emission evaluation value: level_eva_pre
level_eva_pre=14
Target level: level_target
level_target=40

Therefore, in this specific example, the estimated subject distance dv_main is calculated as 1.515, as represented by the following mathematical formula (7). Here, $2^{(1.515/2)}=1.69$, and dv_main=1.515 corresponds to 1.69 m.

$$dv\_\text{main} = dv\_\text{pre} - \log_2(\text{level\_eva\_pre}/\text{level\_target}) \quad (7)$$
$$= 0 - \log_2(14/40)$$
$$= 1.515$$

It is noted that in a case where the pre-light-emission evaluation value level_eva_pre is 0, that is, there is no reflection of the pre-light emission, it is determined that the subject is at an extremely distant position and dv_main is set to a designated large predetermined value.

FIG. 9 illustrates an example of the control processing of calculation of the amount of main light emission in the CPU 153. First, the CPU 153 starts the control processing in step ST51. Next, in step ST52, the CPU 153 determines whether there is so-called AF low contrast where lens distance information cannot be used because of the in focus or indeterminate state. In a case where there is no AF low contrast, dv_lensNear and dv_lensFar are acquired as pieces of information regarding the distance from the camera (imaging apparatus) to the subject.

Figure 10:
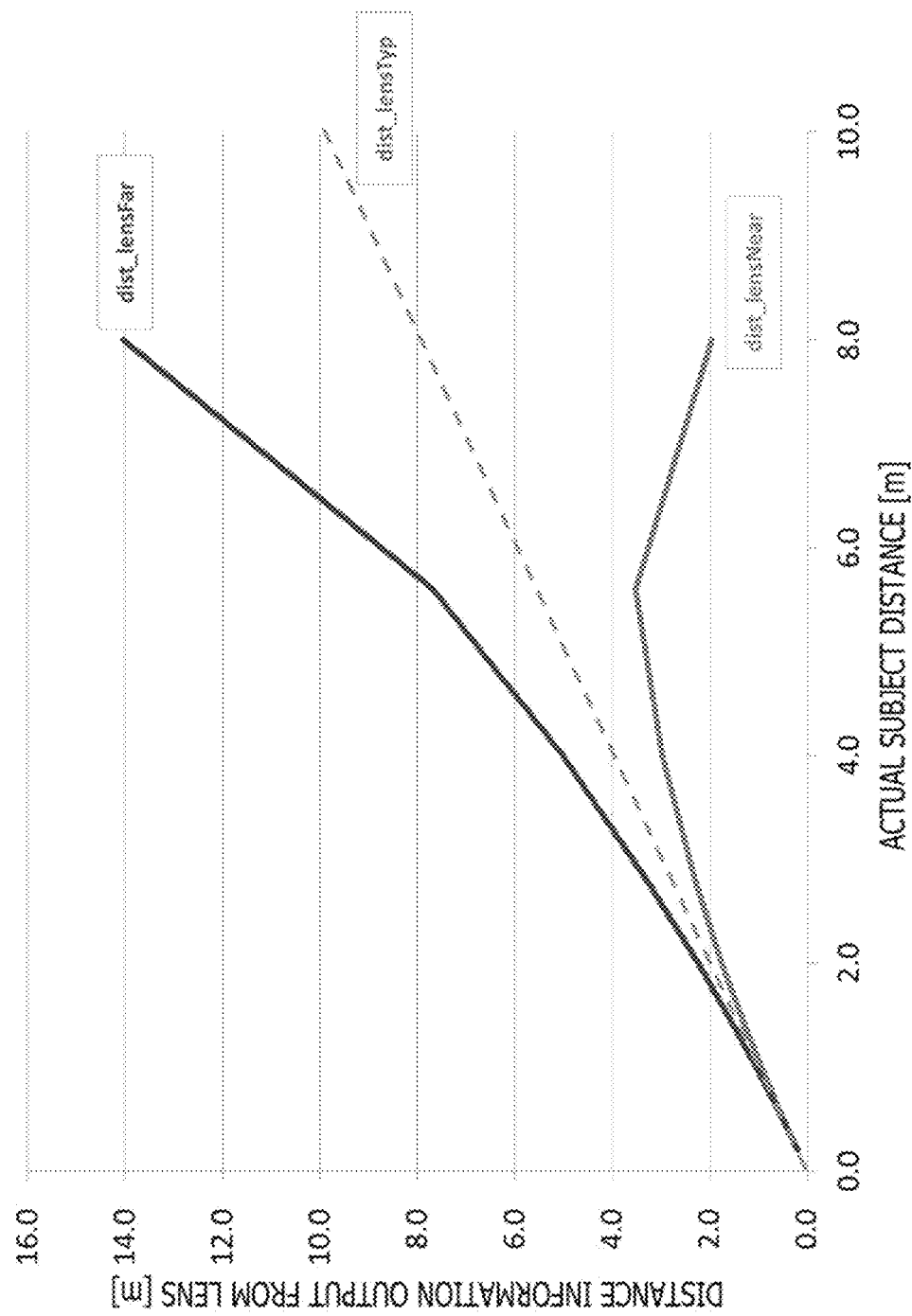
FIG. 10 is a diagram illustrating an example of a correspondence relationship between an actual subject distance [m] and distance information output from a lens apparatus.

While dv_lensNear denotes the estimated near-side subject distance including the near-side error by the DV unit, dv_lensFar denotes the estimated far-side subject distance including the far-side error by the DV unit. DV refers to a unit of the Apex value indicating a distance. A relationship between the distance [m] and DV is as follows. It is noted that here, dv denotes a numerical value, while DV denotes the unit.

dv[DV]=log 2(dist[m]^2) or dv[DV]32 2×log 2(dist[m])
dist: distance [m]
log 2: logarithm to the base 2
dist^2: the square of dist For example, the information regarding the estimated near-side subject distance dist_lensNear[m] and the information regarding the estimated far-side subject distance dist_lensFar[m] are supplied from the lens apparatus 200 to the imaging apparatus 100, together with the information regarding the estimated subject distance dist_lensTyp[m]. FIG. 10 illustrates an example of a correspondence relationship between the actual subject distance [m] and the distance information output from the lens apparatus 200. The CPU 153 can convert each of dist_lensNear[m] and dist_lensFar[m] into the DV unit system to obtain dv_lensNear[DV] and dv_lensFar[DV], respectively. The better the lens accuracy and focusing accuracy, the smaller the difference between dv_lensNear and dv_lensFar.

It is noted that in this case, dv_lensTyp[DV], dv_lensNear[DV], and dv_lensFar[DV], which are the pieces of distance information in the DV unit system, may be supplied from the lens apparatus 200 to the imaging apparatus 100. Here, dv_lensTyp[DV] is obtained by converting dist_lensTyp[m] into the DV unit system.

Alternatively, for example, the information regarding the near-side error (dist_lensNear-dist_lensTyp)[m] and the information regarding the far-side error (dist_lensFar-dist_lensTyp)[m] are supplied from the lens apparatus 200 to the imaging apparatus 100, together with the information regarding the estimated subject distance dist_lensTyp[m]. From these pieces of information, the CPU 153 can obtain the information regarding the estimated near-side subject distance dist_lensNear[m] including the near-side error and the information regarding the estimated far-side subject distance dist_lensFar[m] including the far-side error. Further, each of dist_lensNear[m] and dist_lensFar[m] can be converted into the DV unit system to obtain dv_lensNear[DV] and dv_lensFar[DV], respectively.

Figure 11:
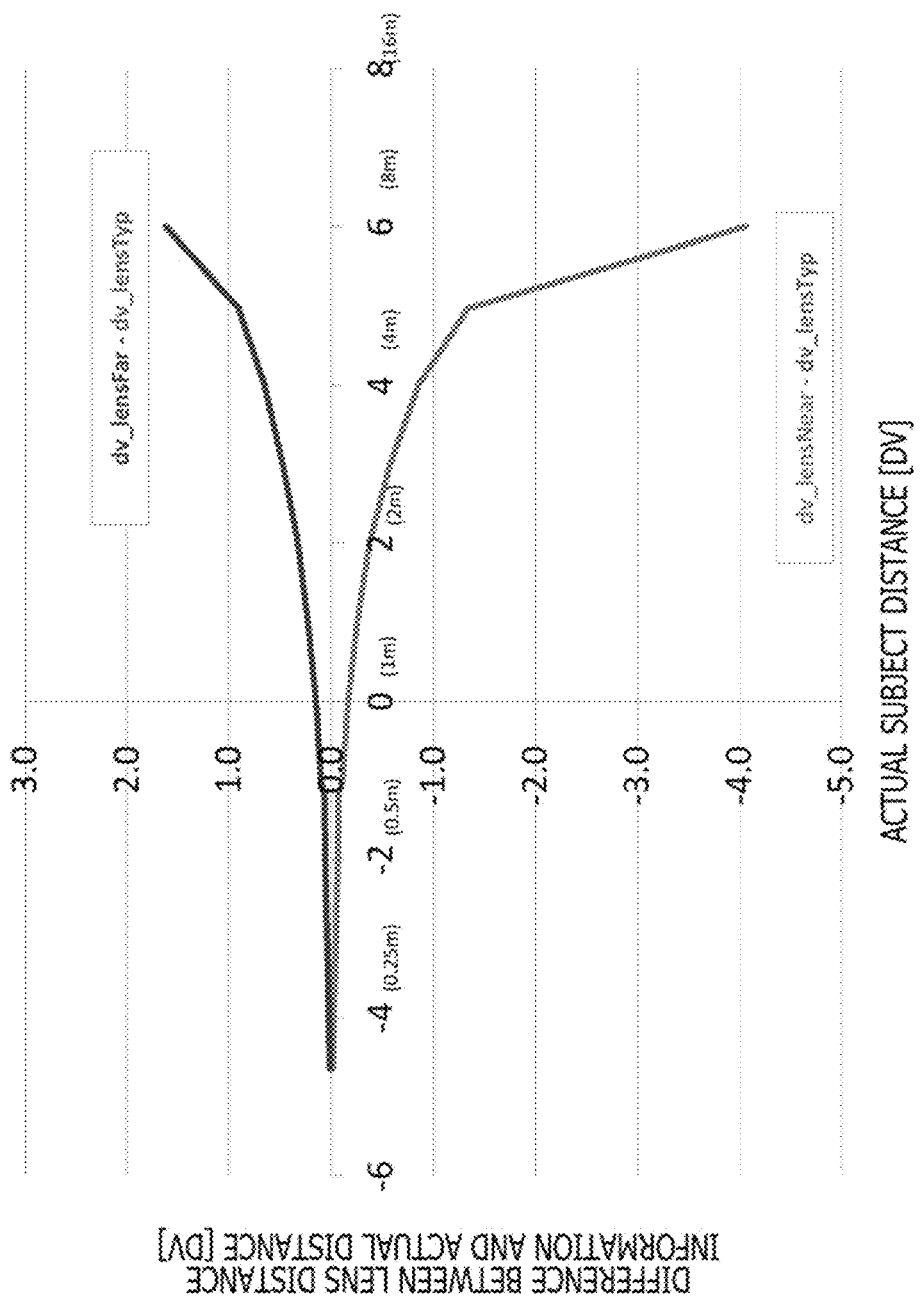
FIG. 11 is a diagram illustrating an example of a correspondence relationship between an actual subject distance [DV] and a difference between the distance information output from a lens apparatus 200 and an actual distance.

It is noted that dv_lensTyp[DV], which is distance information in the DV unit system, and (dv_lensNear-dv_lensTyp)[DV] and (dv_lensFar-dv_lensTyp)[DV], which are pieces of error information in the DV unit system, may be supplied from the lens apparatus 200 to the imaging apparatus 100. FIG. 11 illustrates an example of a correspondence relationship between the actual subject distance [DV] and the difference [DV] between the distance information output from the lens apparatus 200 and the actual distance, that is, (dv_lensNear-dv_lensTyp)[DV] and (dv_lensFar-dv_lensTyp)[DV].

In addition, it is also conceivable to supply dist_lensTyp[m] or dv_lensTyp[DV], which is the information regarding the estimated subject distance, from the lens apparatus 200 to the imaging apparatus 100 and acquire (dist_lensNear-dist_lensTyp)[m] and (dist_lensNear-dist_lensTyp)[m] or (dv_lensNear-dv_lensTyp)[DV] and (dv_lensFar-dv_lensTyp)[DV], which are the pieces of error information, from the correspondence relationship between the estimated subject distances and the errors stored in association with the interchangeable lens 200 in a holding section, for example, the ROM 151 or the RAM 152.

In this case, correspondence relationships between the estimated subject distances and the errors corresponding to a plurality of the interchangeable lenses 200 may be stored in advance in the holding section. Alternatively, when the interchangeable lens 200 is mounted on the imaging apparatus 100, the communication interface 154 may download, from the external server, a correspondence relationship between the estimated subject distances and the errors corresponding to the interchangeable lens 200 on the basis of lens information regarding the interchangeable lens 200 and store the correspondence relationship in the holding section.

In addition, in this case, a correspondence relationship between the estimated subject distances and the errors corresponding to the interchangeable lens 200, which has been input by the user from the operation section 121, may be stored in advance in the holding section. In this case, since it is difficult to input the errors corresponding to all the estimated subject distances, the user may input only errors corresponding to several estimated subject distances and the CPU 153 may perform approximation computation using the input errors to interpolate error information corresponding to the other distances.

Next, returning to FIG. 9, in step ST53, the CPU 153 determines whether or not there is AF low contrast. In a case where there is AF low contrast, the CPU 153 proceeds to processing in step ST54. In this step ST54, the CPU 153 sets a final estimated subject distance dv_final for calculating the amount of main light emission as the estimated subject distance using the pre-light emission dv_main.

Next, the CPU 153 computes the amount of main light emission iv_main from the final estimated subject distance dv_final and main-light-emission exposure control values in step ST55. In this case, in a case where the aperture at the time of the main light emission is assumed to be av_main and the sensitivity (gain control) at the time of the main light emission is assumed to be sv_main, the amount of main light emission iv_main is obtained by the following mathematical formula (8) and a flash appropriate guide number Gno. is obtained by the following mathematical formula (9).

$$iv\_main = dv\_final + av\_main - sv\_main \quad (8)$$

$$Gno. = 2^{((iv\_main+5)/2)} \quad (9)$$

Here, specific examples of calculation of the amount of main light emission iv_main and the flash appropriate guide number Gno. will be described. The control values (aperture and sensitivity) at the time of the main light emission are assumed to be the following values, for example. The control values may not necessarily match the control values at the time of the pre-light emission.

Aperture at the time of the main light emission: av_main
Fno.4.0->av_main=4

Sensitivity (gain control) at the time of the main light emission: sv_main
ISO800->sv_main=8

The amount of main light emission iv_main is calculated from each control value, as represented by the following mathematical formula (10). It is noted that the value of dv_final is assumed to be 1.515, which has been obtained by the above-described mathematical formula (7). In addition, the flash appropriate guide number Gno. is obtained as 2.4, as represented by the following mathematical formula (11).

$$iv\_main = dv\_final + av\_main - sv\_main = 1.515 + 4 - 8 = -2.485 \quad (10)$$

$$Gno. = 2^{((-2.485+5)/2)} = 2.4 \quad (11)$$

Returning to FIG. 9, after the processing in step ST55, the CPU 153 ends the control processing in step ST56.

In a case where there is no AF low contrast in step ST53, the CPU 153 determines or not in step ST57 whether the bounce flag has been set. In a case where the bounce flag has not been set, the CPU 153 proceeds to processing in step ST58.

In this step ST58, the CPU 153 determines whether or not the estimated subject distance using the pre-light emission dv_main is within a range from the estimated far-side subject distance dv_lensFar to the estimated near-side subject distance dv_lensNear. In a case where the CPU 153 determines that the estimated subject distance using the pre-light emission dv_main is within the range, the CPU 153 sets the final estimated subject distance dv_final for calculating the amount of main light emission as the estimated subject distance using the pre-light emission dv_main in step 54. Further, the CPU 153 computes the amount of main light emission iv_main from the final estimated subject distance dv_final and the main-light-emission exposure control values in step ST55. After that, the CPU 153 ends the control processing in step ST56.

In a case where the CPU 153 determines in step ST58 that the estimated subject distance using the pre-light emission dv_main is not within the range, the CPU 153 proceeds to processing in step ST59. In this step ST59, the CPU 153 determines whether or not the estimated subject distance using the pre-light emission dv_main is within a far range longer than dv_lensFar+2DV.

Figure 12:
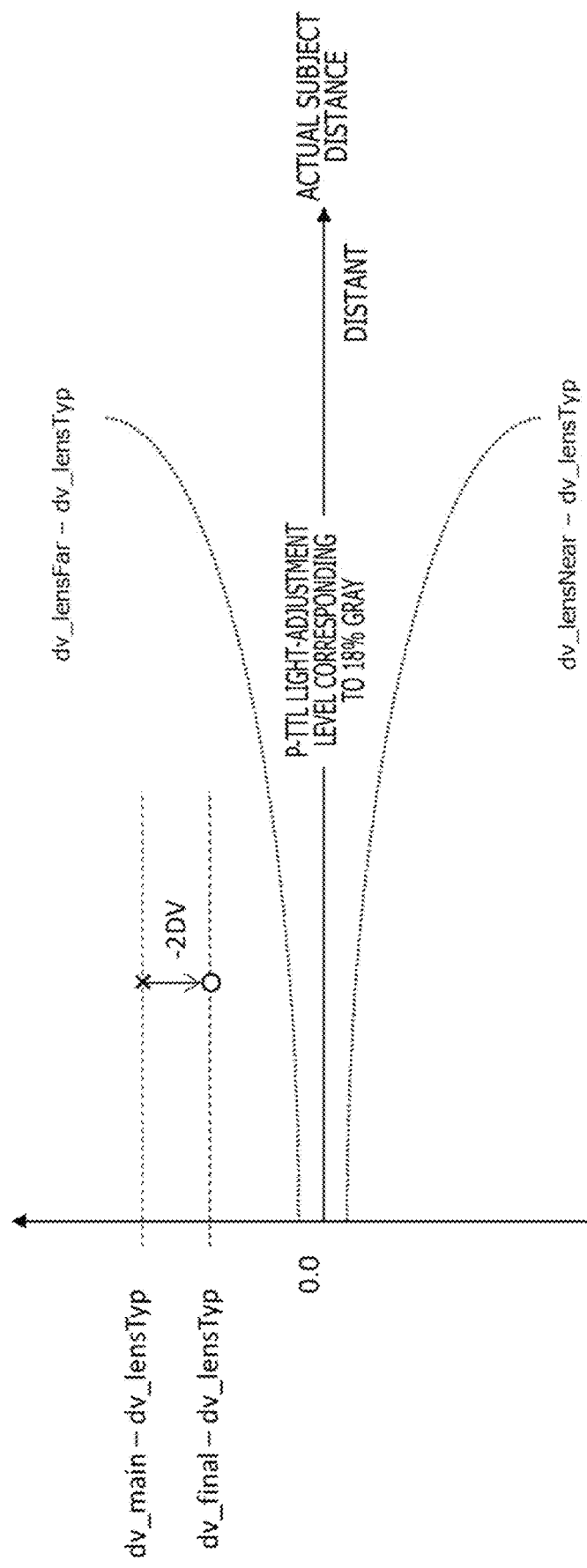
FIG. 12 is a diagram for describing correction when a final estimated subject distance dv_final is obtained.

In a case where dv_main >dv_lensFar+2DV is satisfied in step ST59, the CPU 153 corrects the final estimated subject distance dv_final to the light-emission-amount suppression side by subtracting only 2DV from the estimated subject distance using the pre-light emission dv_main in step ST60. FIG. 12 illustrates a correction state for this case. In the example in the figure, "x" denotes the estimated subject distance using the pre-light emission dv_main, while "o" denotes the final estimated subject distance dv_final. It is noted that 2DV is an example and not a limitation.

After the processing in this step ST60, the CPU 153 computes the amount of main light emission iv_main from the final estimated subject distance dv_final and the main-light-emission exposure control values in step ST55. After that, the CPU 153 ends the control processing in step ST56.

In addition, in a case where dv_main >dv_lensFar+2DV is not satisfied in step ST59, the CPU 153 determines in step ST61 whether or not the estimated subject distance using the pre-light emission dv_main is within a far range longer than dv_lensFar.

Figure 13:
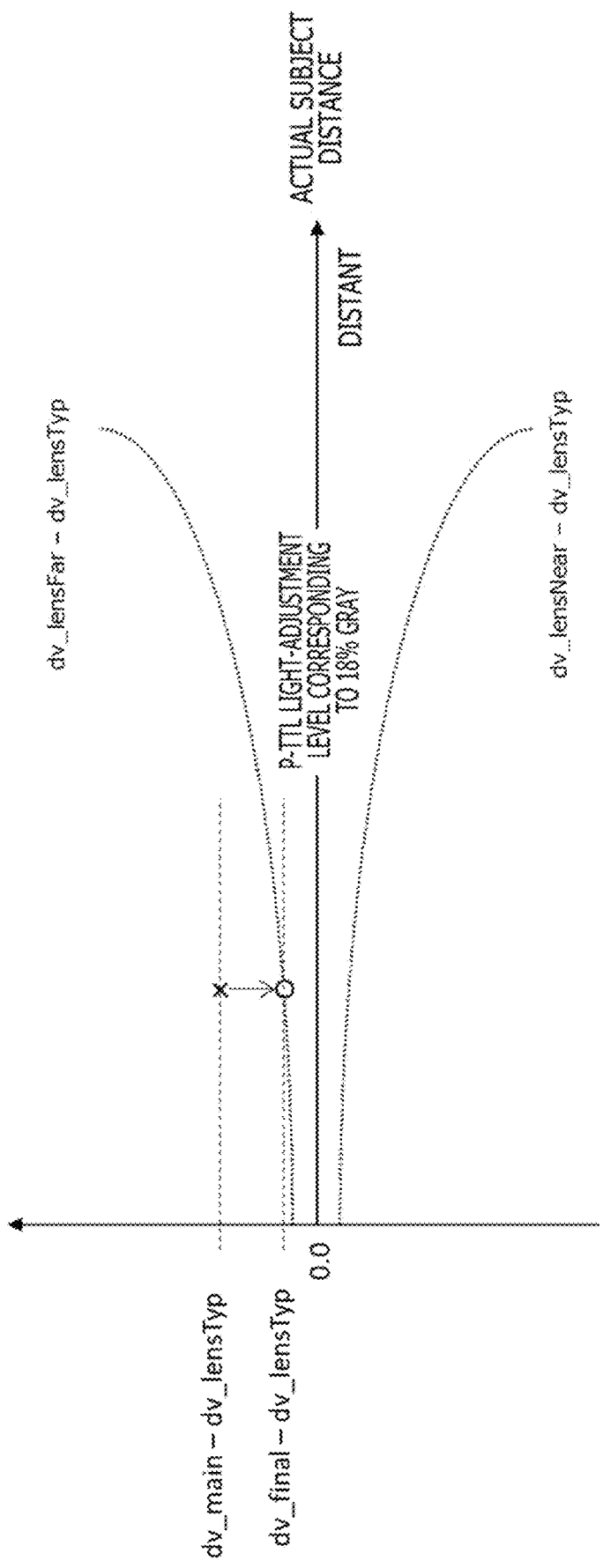
FIG. 13 is a diagram for describing correction when the final estimated subject distance dv_final is obtained.

In a case where dv_main >dv_lensFar is satisfied, the CPU 153 corrects the final estimated subject distance dv_final to the light-emission-amount suppression side by setting the final estimated subject distance dv_final as the estimated far-side subject distance dv_lensFar in step ST62. FIG. 13 illustrates a correction state for this case. In the example in the figure, "x" denotes the estimated subject distance using the pre-light emission dv_main, while "o" denotes the final estimated subject distance dv_final. It is noted that 2DV is an example and not a limitation.

After the processing in this step ST62, the CPU 153 computes the amount of main light emission iv_main from the final estimated subject distance dv_final and the main-light-emission exposure control values in step ST55. After that, the CPU 153 ends the control processing in step ST56.

In addition, in a case where dv_main >dv_lensFar is not satisfied in step ST61, the CPU 153 determines in step ST63 whether or not the estimated subject distance using the pre-light emission dv_main is within a near range equal to or less than dv_lensFar−2DV.

Figure 14:
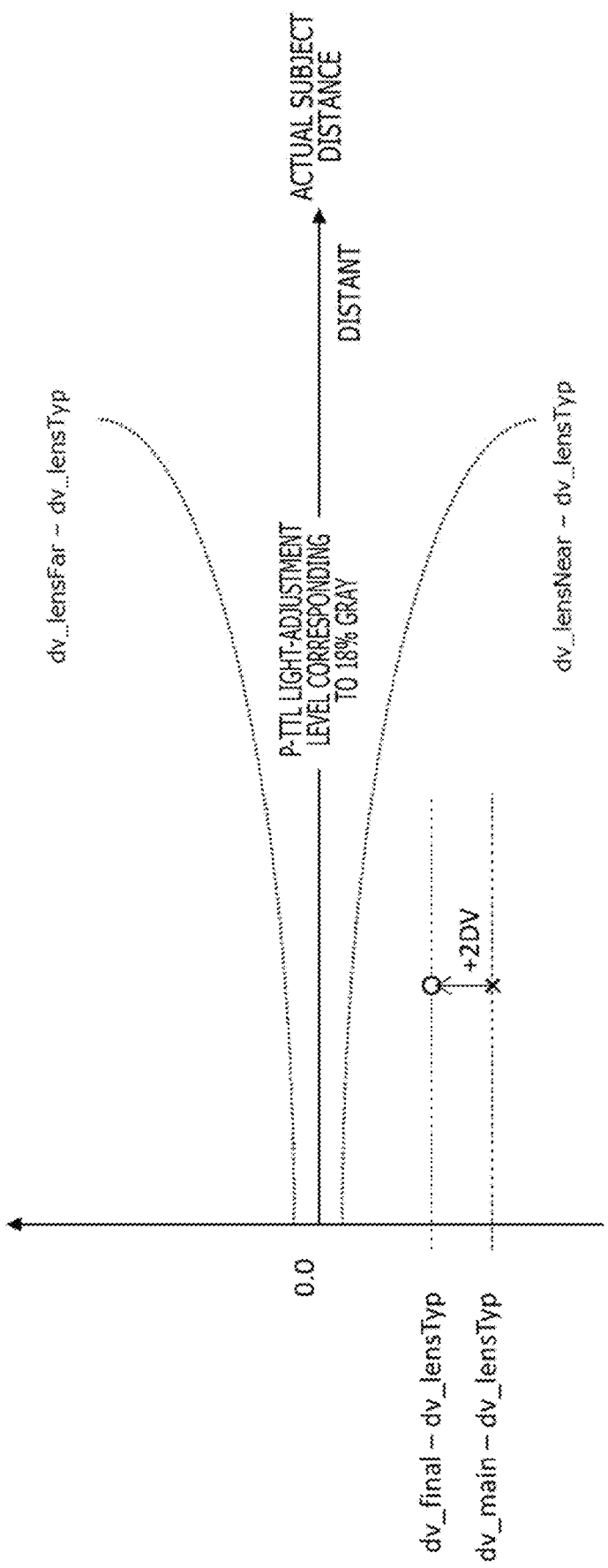
FIG. 14 is a diagram for describing correction when the final estimated subject distance dv_final is obtained.

In a case where dv_main <=dv_lensNear−2DV is satisfied, the CPU 153 corrects the final estimated subject distance dv_final to the light-emission-amount increase side by adding only 2DV to the estimated subject distance using the pre-light emission dv_main in step ST64. FIG. 14 illustrates a correction state for this case. In the example in the figure, "x" denotes the estimated subject distance using the pre-light emission dv_main, while "o" denotes the final estimated subject distance dv_final. It is noted that 2DV is an example and not a limitation.

After the processing in this step ST64, the CPU 153 computes the amount of main light emission iv_main from the final estimated subject distance dv_final and the main-light-emission exposure control values in step ST55. After that, the CPU 153 ends the control processing in step ST56.

Figure 15:
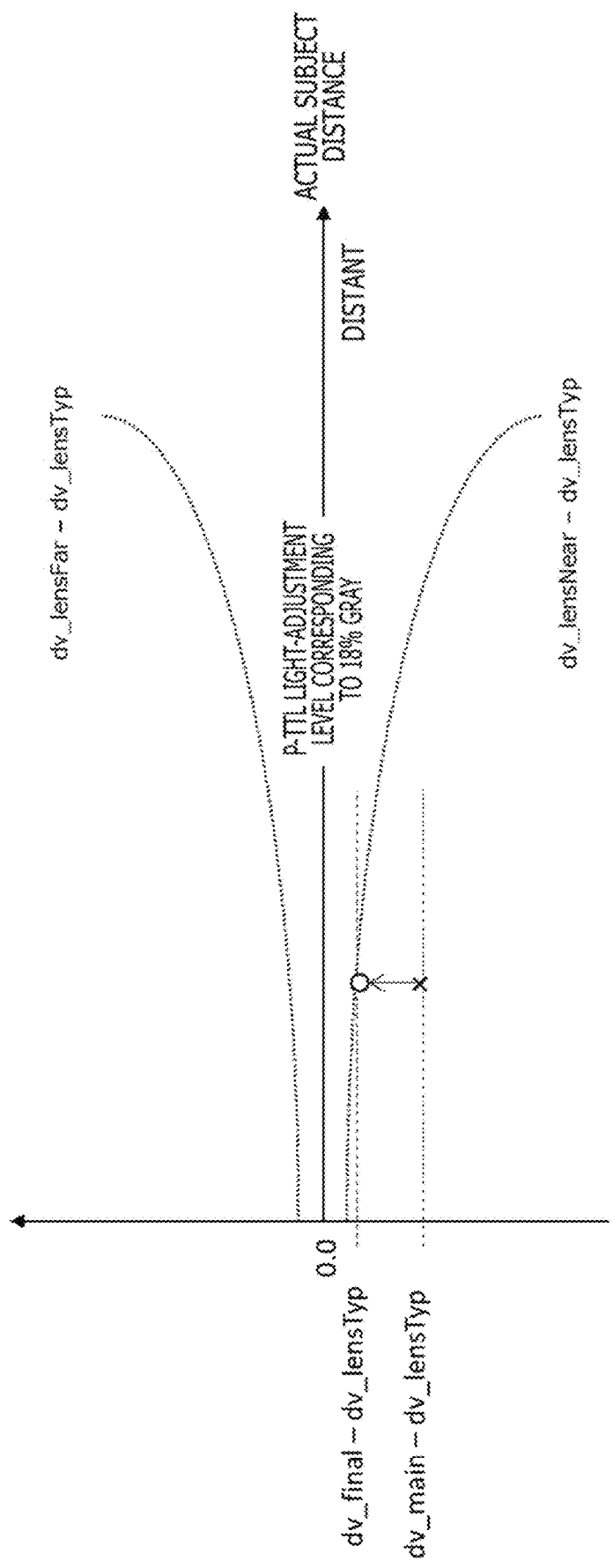
FIG. 15 is a diagram for describing correction when the final estimated subject distance dv_final is obtained.

In addition, in a case where dv_main <=dv_lensNear−2DV is not satisfied in step ST63, the CPU 153 corrects the final estimated subject distance dv_final to the light-emission-amount increase side by setting the final estimated subject distance dv_final as the estimated near-side subject distance dv_lensNear in step ST65. FIG. 15 illustrates a correction state for this case. In the example in the figure, "x" denotes the estimated subject distance using the pre-light emission dv_main, while "o" denotes the final estimated subject distance dv_final.

After the processing in this step ST65, the CPU 153 computes the amount of main light emission iv_main from the final estimated subject distance dv_final and the main-light-emission exposure control values in step ST55. After that, the CPU 153 ends the control processing in step ST56.

In addition, in a case where the bounce flag has been set in step ST57, the CPU 153 proceeds to processing in step ST66. In this step ST66, the CPU 153 determines whether or not the estimated subject distance using the pre-light emission dv_main is within a near range equal to or less than the estimated near-side subject distance dv_lensNear.

In a case where dv_main <=dv_lensNear is not satisfied, the CPU 153 sets the final estimated subject distance dv_final for calculating the amount of main light emission as the estimated subject distance using the pre-light emission dv_main in step 54. Further, the CPU 153 computes the amount of main light emission iv_main from the final estimated subject distance dv_final and the main-light-emission exposure control values in step ST55. After that, the CPU 153 ends the control processing in step ST56.

On the other hand, in a case where dv_main <=dv_lensNear is satisfied in step ST66, the CPU 153 corrects the final estimated subject distance dv_final to the light-emission-amount increase side by setting the final estimated subject distance dv_final as the estimated near-side subject distance dv_lensNear in step ST65 (see FIG. 15). After the processing in this step ST65, the CPU 153 computes the amount of main light emission iv_main from the final estimated subject distance dv_final and the main-light-emission exposure control values in step ST55. After that, the CPU 153 ends the control processing in step ST56.

It is noted that although the CPU 153 proceeds to the processing in step ST66 in a case where the bounce flag has been set in step ST57 in the example of the control processing illustrated in the flowchart in FIG. 9, the CPU 153 may proceed to the processing in step ST63. In this case, in a case where dv_main <=dv_lensNear−2DV is satisfied, the final estimated subject distance dv_final is obtained by adding only 2DV to the estimated subject distance using the pre-light emission dv_main. In a case where dv_main <=dv_lensNear−2EV is not satisfied, the final estimated subject distance dv_final is set as the estimated near-side subject distance dv_lensNear.

Figure 16:
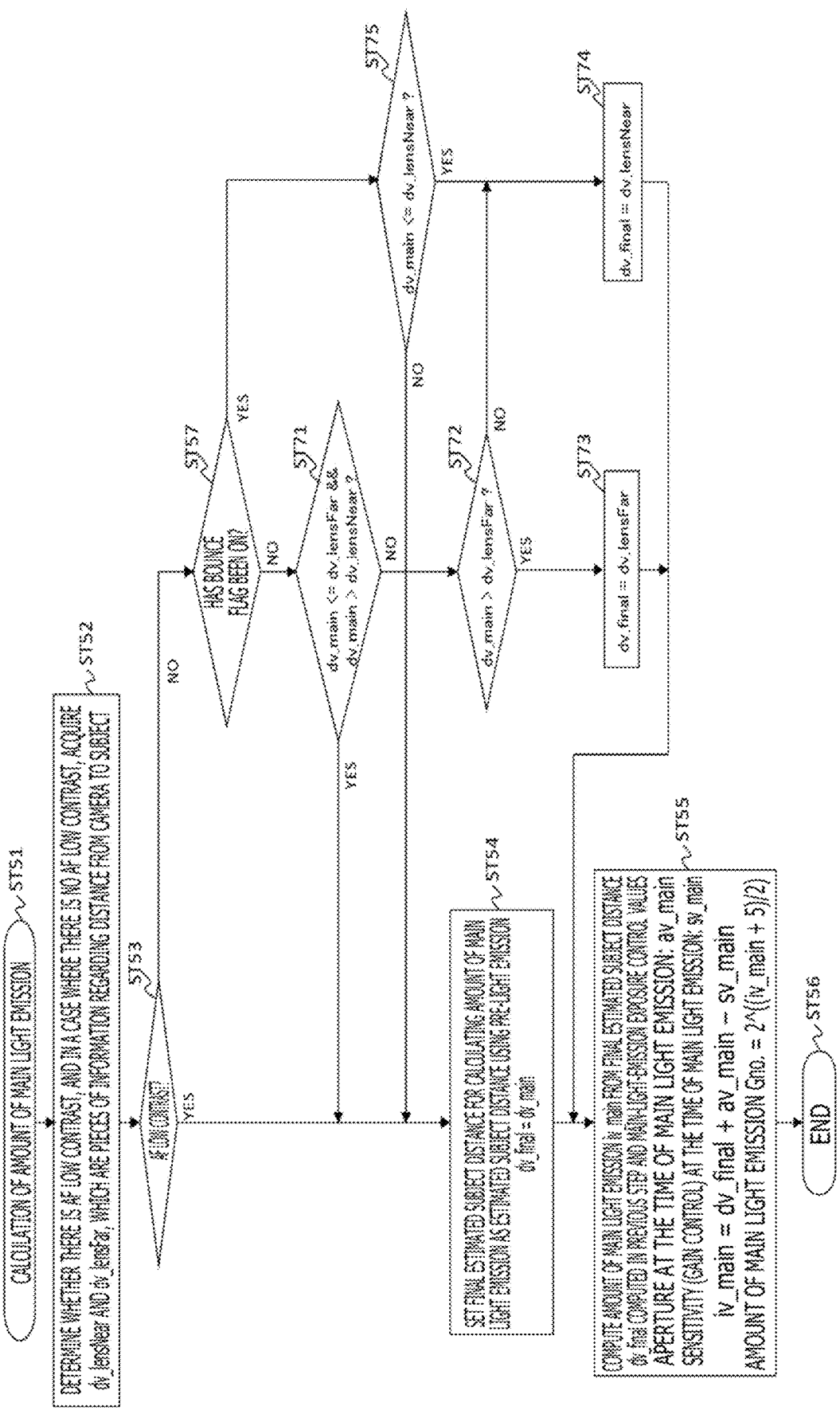
FIG. 16 is a flowchart illustrating another example of control processing of calculation of the amount of main light emission.

In addition, a flowchart in FIG. 16 illustrates another example of the control processing of calculation of the amount of main light emission in the CPU 153. In FIG. 16, steps corresponding to the steps in FIG. 9 will be assigned the same reference signs, and the detailed description thereof will be omitted.

In a case where the bounce flag has not been set in step ST57, the CPU 153 proceeds to processing in step ST71. In this step ST71, the CPU 153 determines whether or not the estimated subject distance using the pre-light emission dv_main is within the range from the estimated far-side subject distance dv_lensFar to the estimated near-side subject distance dv_lensNear.

In a case where the CPU 153 determines that the estimated subject distance using the pre-light emission dv_main is within the range, the CPU 153 sets the final estimated subject distance dv_final for calculating the amount of main light emission as the estimated subject distance using the pre-light emission dv_main in step 54. Further, the CPU 153 computes the amount of main light emission iv_main from the final estimated subject distance dv_final and the main-light-emission exposure control values in step ST55. After that, the CPU 153 ends the control processing in step ST56.

In a case where the CPU 153 determines in step ST71 that the estimated subject distance using the pre-light emission dv_main is not within the range, the CPU 153 proceeds to processing in step ST72. In this step ST72, the CPU 153 determines whether or not the estimated subject distance using the pre-light emission dv_main is within the far range longer than dv_lensFar.

In a case where dv_main >dv_lensFar is satisfied, the CPU 153 corrects the final estimated subject distance dv_final to the light-emission-amount suppression side by setting the final estimated subject distance dv_final as the estimated far-side subject distance dv_lensFar in step ST73 (see FIG. 13). On the other hand, in a case where dv_main >dv_lensFar is not satisfied, the CPU 153 corrects the final estimated subject distance dv_final to the light-emission-amount increase side by setting the final estimated subject distance dv_final as the estimated near-side subject distance dv_lensNear in step ST74 (see FIG. 15).

After the processing in this step ST73 or ST74, the CPU 153 computes the amount of main light emission iv_main from the final estimated subject distance dv_final and the main-light-emission exposure control values in step ST55. After that, the CPU 153 ends the control processing in step ST56.

In addition, in a case where the bounce flag has been set in step ST57, the CPU 153 proceeds to processing in step ST75. In this step ST75, the CPU 153 determines whether or not the estimated subject distance using the pre-light emission dv_main is within the near range equal to or less than the estimated near-side subject distance dv_lensNear.

In a case where dv_main <=dv_lensNear is not satisfied, the CPU 153 sets the final estimated subject distance dv_final for calculating the amount of main light emission as the estimated subject distance using the pre-light emission dv_main in step 54. Further, the CPU 153 computes the amount of main light emission iv_main from the final estimated subject distance dv_final and the main-light-emission exposure control values in step ST55. After that, the CPU 153 ends the control processing in step ST56.

On the other hand, in a case where dv_main <=dv_lensNear is satisfied in step ST75, the CPU 153 corrects the final estimated subject distance dv_final to the light-emission-amount increase side by setting the final estimated subject distance dv_final as the estimated near-side subject distance dv_lensNear in step ST74 (see FIG. 15). After the processing in this step ST74, the CPU 153 computes the amount of main light emission iv_main from the final estimated subject distance dv_final and the main-light-emission exposure control values in step ST55. After that, the CPU 153 ends the control processing in step ST56.

It is noted that although there is no limitation to the correction amount in the control processing of calculation of the amount of main light emission illustrated in the flowchart in FIG. 16, there is a limitation to the correction amount in the control processing of calculation of the amount of main light emission illustrated in the above flowchart in FIG. 9. The correction limitation is set in consideration of the presence of models with poor focusing accuracy.

Some models have poor focusing accuracy and often fall into "false focusing" (the camera determines that the subject is in focus, but the subject is actually not in focus) without becoming AF low contrast. Setting the limitation to the correction amount can suppress the degree of overexposure and underexposure in a case where false focusing has occurred. This limits the extent of damage to exposure.

In addition, although the correction amount is limited to 2DV in the control processing of calculation of the amount of main light emission illustrated in the flowchart in FIG. 9, this limitation amount should be set depending on the lens accuracy and the focusing accuracy. In many cases, the lens accuracy and the focusing accuracy also depend on the focal length at the time of photographing (generally, it is difficult to attain the lens accuracy on the wide-angle side).

Figure 17:
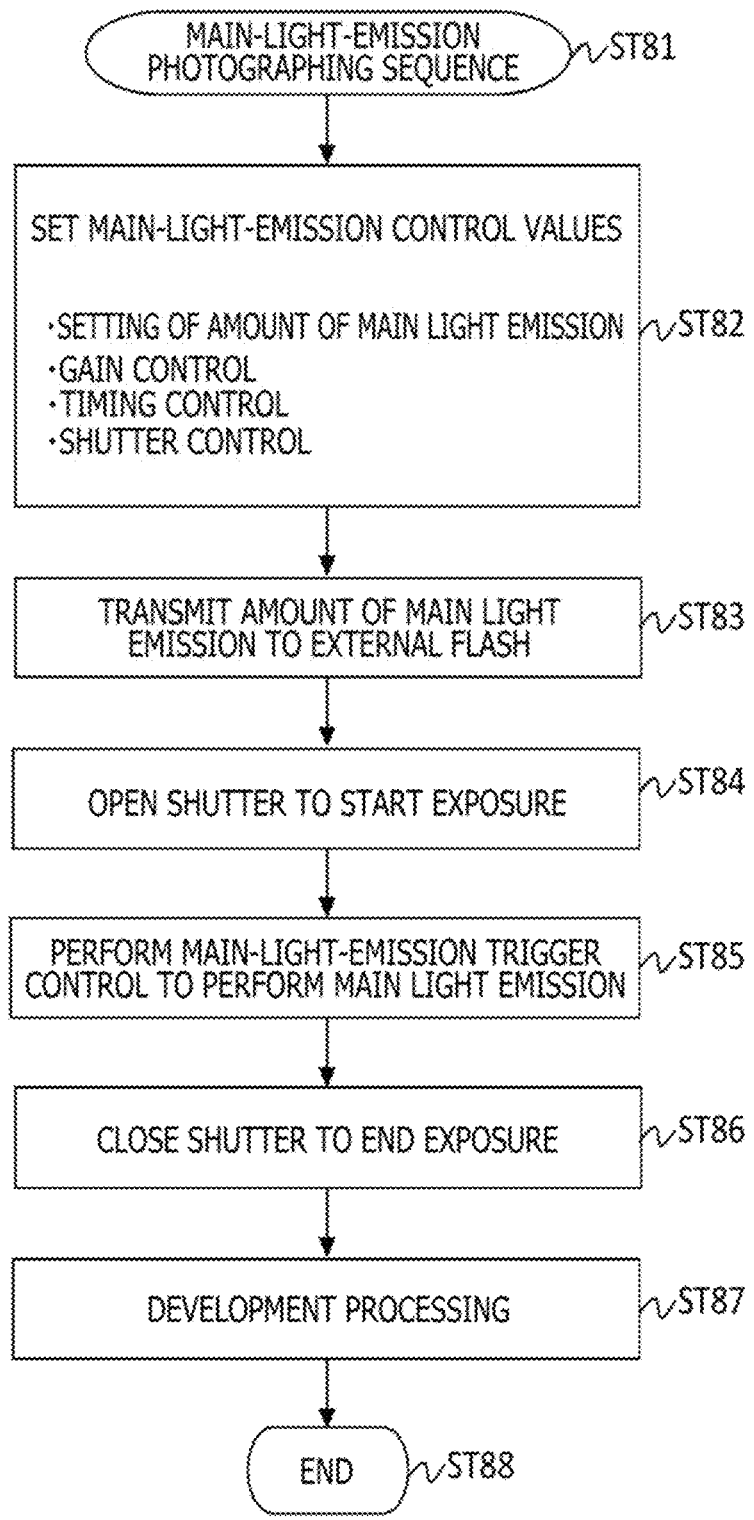
FIG. 17 is a flowchart illustrating an example of control processing of a main-light-emission photographing sequence.

A flowchart in FIG. 17 illustrates an example of control processing of the main-light-emission photographing sequence in the CPU 153. First, the CPU 153 starts the control processing in step ST81. After that, the CPU 153 sets pre-light-emission control values in step ST82.

Next, the CPU 153 transmits the amount of main light emission from the light-emission control section 172 to the external flash 171 in step ST83 and opens the shutter 111 to start exposure in step ST84. In step ST85, the CPU 153 performs main-light-emission trigger control to perform main light emission. After that, the CPU 153 closes the shutter to end exposure in step ST86.

Next, the CPU 153 performs imaging processing in step ST87. After the processing in this step ST87, the CPU 153 ends the control processing in step ST88.

As described above, in the imaging apparatus 100 in the imaging system 10 illustrated in FIG. 1, in a case where the external flash 171 is in the bounce state in which the external flash 171 does not face the subject and the estimated subject distance using the pre-light emission dv_main is within the near range equal to or less than the estimated near-side subject distance dv_lensNear, the final estimated subject distance dv_final is corrected to the light-emission-amount increase side. Therefore, it is possible to make the final estimated subject distance dv_final close to an appropriate value in a case where the reflectance of the subject is extremely high. This, as a result, makes it possible to increase the accuracy of adjusting the main light emission.

2. Modification

It is noted that although in the example described in the above-described embodiment, the amount of main light emission is controlled depending on whether the external flash 171 performs direct irradiation or bounce irradiation, that is, whether bouncing is on or off, it is also conceivable to control the amount of main light emission according to the bounce angle.

Figure 18:
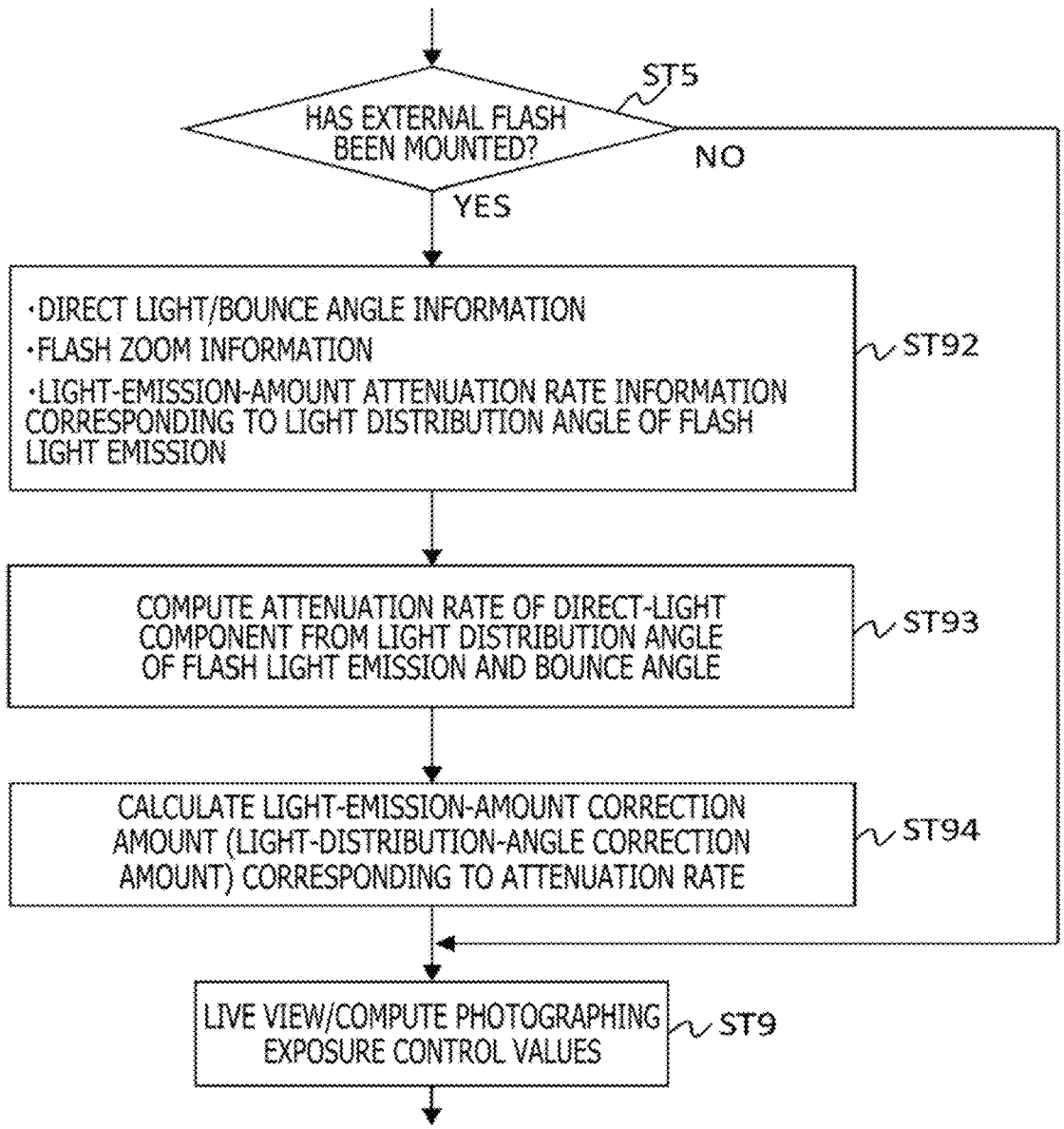
FIG. 18 is a flowchart illustrating an example of control processing of acquisition of a state of an external flash in a case where the amount of main light emission is controlled according to the bounce accuracy.

In a case where the amount of main light emission is controlled according to the bounce accuracy, the processing in steps ST6 to ST8 in the above-described flowchart in FIGS. 2A and 2B are replaced with processing in steps STST92 to ST94 illustrated in a flowchart in FIG. 18.

In a case where the external flash 171 has been mounted in step ST5, the CPU 153 proceeds to processing in step ST92. In this step ST92, the CPU 153 acquires, from the external flash 171, direct light/bounce angle information, flash zoom information, and light-emission-amount attenuation rate information corresponding to the light distribution angle of flash light emission. It is noted that it is also conceivable that the CPU 153 acquires the light-emission-amount attenuation rate information corresponding to the light distribution angle from the holding section in the imaging apparatus 100, for example, the ROM 151 or the RAM 152 on the basis of the bounce angle information acquired from the external flash 171.

In this case, correspondence relationships between the bounce angles and the light-emission-amount attenuation rates corresponding to a plurality of the external flashes 171 may be stored in advance in the holding section. Alternatively, when the external flash 171 is mounted on the imaging apparatus 100, the communication interface 154 may download, from the external server, a correspondence relationship between the bounce angles and the light-emission-amount attenuation rates corresponding to the external flash 171 on the basis of information regarding the external flash 171 and store the correspondence relationship in the holding section.

In addition, in this case, a correspondence relationship between the bounce angles and the light-emission-amount attenuation rates, which has been input by the user from the operation section 121, may be stored in advance in the holding section. In this case, since it is difficult to input the light-emission-amount attenuation rates corresponding to all the bounce angles, the user may input only the light-emission-amount attenuation rates corresponding to several bounce angles and the CPU 153 may perform approximation computation using the input light-emission-amount attenuation rates to interpolate the light-emission-amount attenuation rates corresponding to the other bounce angles.

Next, the CPU 153 computes the attenuation rate of a direct-light component from the light distribution angle of flash light emission and the bounce angle in step ST93. Next, the CPU 153 calculates the light-emission-amount correction amount (light-distribution-angle correction amount) corresponding to the attenuation rate in step ST94. After the processing in step ST94, the CPU 153 proceeds to processing in step ST9. It is noted that in step ST5, in a case where the external flash 171 has not been mounted, the CPU 153 immediately proceeds to the processing in step ST9.

Figure 19:
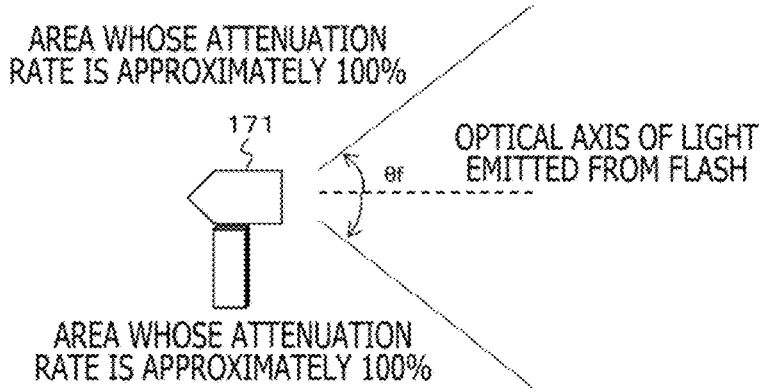
FIG. 19 is a diagram illustrating a relationship between an optical axis of the external flash and the vertical accuracy (elevation angle) θf from the optical axis.

FIG. 19 illustrates a relationship between the optical axis of the external flash 171 and the vertical accuracy (elevation angle) θf from the optical axis. FIG. 20 illustrates the light-emission-amount attenuation rate for each of the angular directions in the light distribution angles of 0 to 90 degrees in the vertical direction according to the respective flash zoom positions.

For example, in a case where the flash zoom position is set for a focal length of 35 mm, the amount of light emission at an elevation angle of 40° with respect to the optical axis of the light-emitting section of the flash is attenuated by 30% from the amount of light emission at the optical axis. Since the light-emission-amount attenuation rates at each flash zoom position depend on the optical design of the light-emitting section of the flash, the imaging apparatus (camera) 100 obtains information from the light-emitting section of the flash. Alternatively, in a case where the light-emission-amount attenuation rates are the same among any flashes in terms of the optical design, the light-emission-amount attenuation rates may be held as a table in the imaging apparatus (camera) 100.

Although the attenuation rates at the identical angles in the vertical direction have the same numerical value in FIG. 20, the attenuation rates may have different numerical values in the vertical direction. In a case where the attenuation rate is known, the light-distribution-angle correction amount (EV) corresponding to the attenuation rate can be obtained by the following mathematical formula (12).

Light-distribution-angle correction amount ($EV$)=Log 2(1/(1−attenuation rate))　　　(12)

Generally, the amount of light emission instructed by the camera to the flash is the amount of light emission at the center of the optical axis of the light-emitting section. In a case where the camera gives an instruction to the flash taking into account the light-distribution-angle correction amount obtained by the above-described mathematical formula (12) for the amount of light emission at an angle deviated from the light-emission optical axis, the amount of light emission at this angle becomes the amount of light emission desired by the camera.

Figure 21:
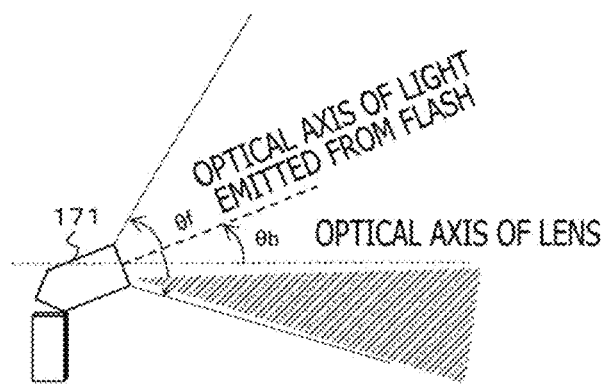
FIG. 21 is a diagram illustrating a relationship among the optical axis of the external flash, the vertical accuracy (elevation angle) θf from the optical axis thereof, and the bounce angle θb.

Incidentally, in a case where the light-emitting section of the flash is bounced upward, the subject on the photographing optical axis (lens optical axis) is irradiated with the direct-light component of the flash depending on the bounce angle. FIG. 21 illustrates a relationship among the optical axis of the external flash 171, the vertical accuracy (elevation angle) θf from the optical axis thereof, and the bounce angle θb. An angle area in a hatched portion denotes the direct-light component of the flash. The subject is directly irradiated with the light emission in this angle area.

A correlation between the "light-emitting section of the flash—the subject" distance and the amount of light emission holds true for this direct-light component.

Aperture av=log 2 (Fno.$^2$)
Sensitivity sv=log 2(ISO/100)+5
Distance dv=log 2(dist$^2$) dist[m]
Amount of pre-light emission iv=log 2(Gno.$^2$)−5
Amount of light emission Gno.=Distance[m]×Aperture Fno./√/(Sensitivity ISO/100)

(iv=dv+av−sv)

As described above, the direct-light component has been subjected to the light-distribution-angle correction amount corresponding to the angle. Assuming that the bounce angle from the lens optical axis is θb, the light-distribution-angle correction amount thereof is the light-distribution-angle correction amount for an angle of:

θ=θf−θb

Figure 22:
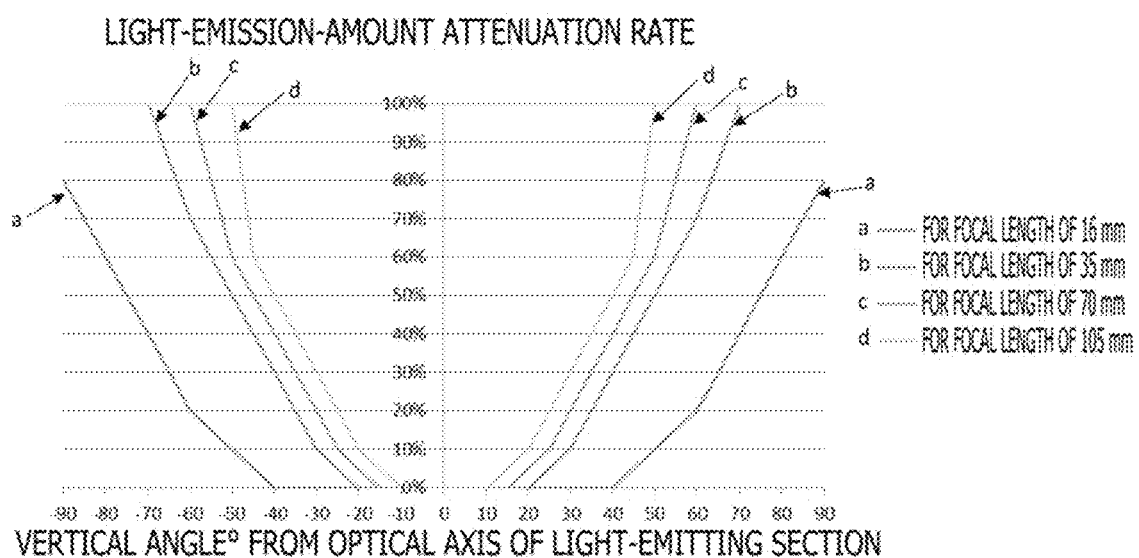
FIG. 22 is a diagram illustrating an example of a relationship between the vertical angle° from the optical axis of a light-emitting section and the light-emission attenuation rate.
Figure 23:
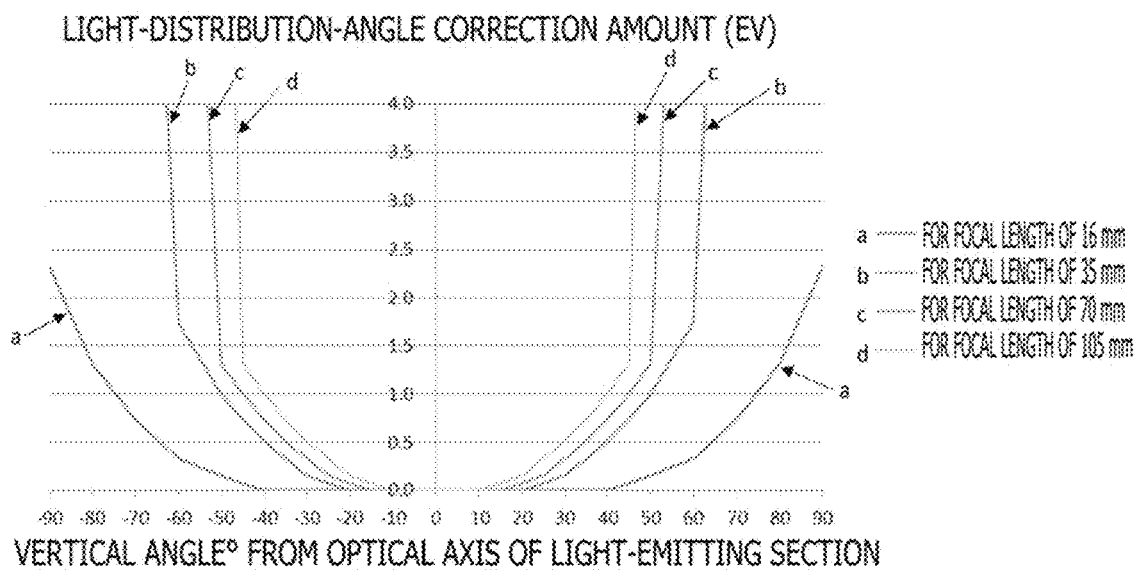
FIG. 23 is a diagram illustrating an example of a relationship between the vertical angle° from the optical axis of the light-emitting section and the light-distribution-angle correction amount (EV).

FIG. 22 illustrates an example of a relationship between the vertical angle° from the optical axis of the light-emitting section and the light-emission attenuation rate, with a denoting for a focal length of 16 mm, b for a focal length of 35 mm, c for a focal length of 70 mm, and d for a focal length of 105 mm. In addition, FIG. 23 illustrates an example of a relationship between the vertical angle° from the optical axis of the light-emitting section and the light-distribution-angle correction amount (EV), with a denoting for a focal length of 16 mm, b for a focal length of 35 mm, c for a focal length of 70 mm, and d for a focal length of 105 mm.

Figure 24:
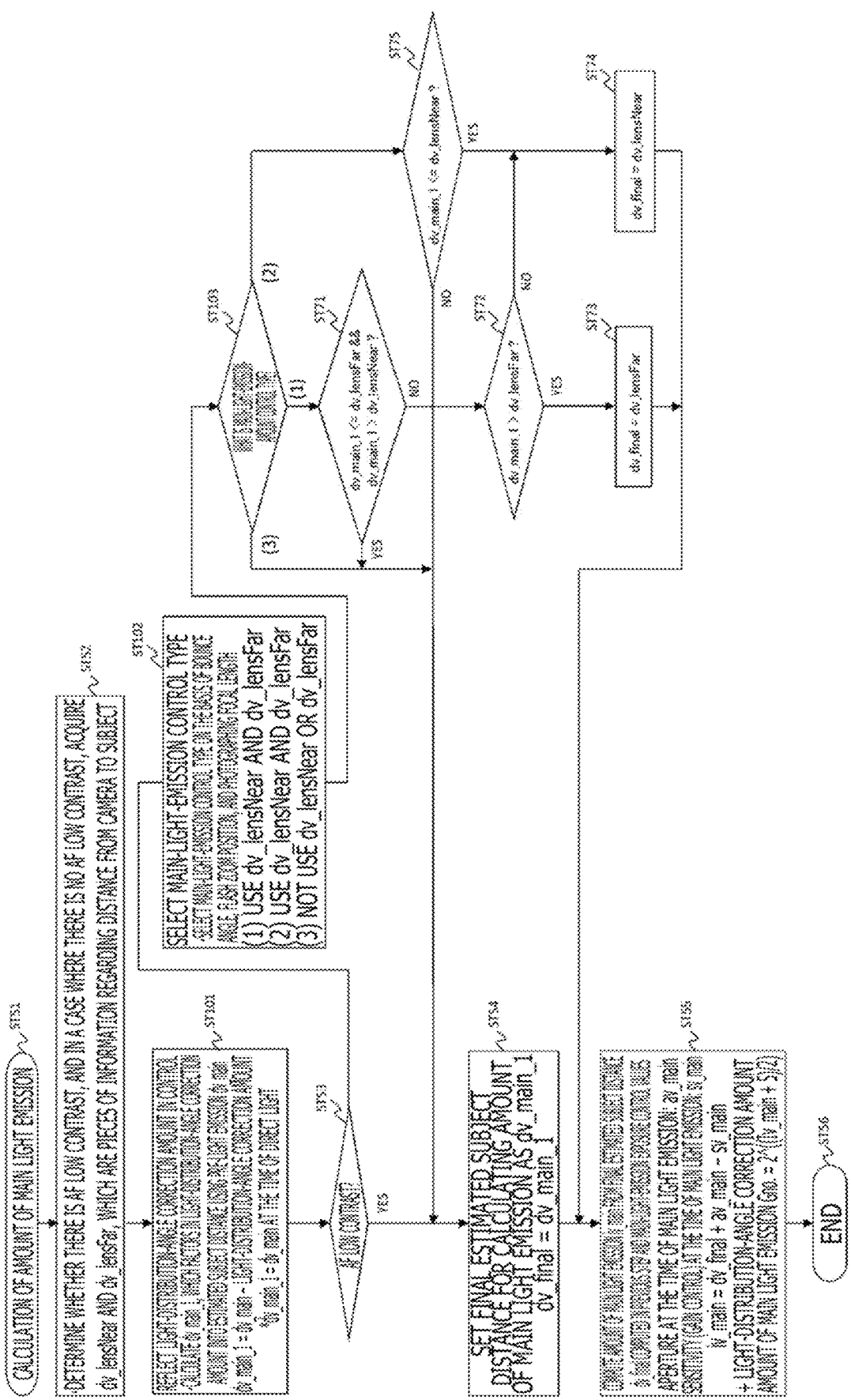
FIG. 24 is a flowchart illustrating an example of control processing of calculation of the amount of main light emission.

A flowchart in FIG. 24 illustrates an example of control processing of calculation of the amount of main light emission in the CPU 153. In FIG. 24, parts corresponding to the parts in FIG. 16 are assigned the same reference signs and illustrated, and the detailed description thereof will be omitted, as appropriate.

First, in step ST51, the CPU 153 starts the control processing. Next, in step ST52A the CPU 153 determines whether there is so-called AF low contrast where the lens distance information cannot be used because of the in focus or indeterminate state. In a case where there is no AF low contrast, dv_lensNear and dv_lensFar are acquired as pieces of information regarding the distance from the camera (imaging apparatus) to the subject.

Next, in step ST101, the CPU 153 uses the following mathematical formula (13) to calculate dv_main_1, which factors in the light-distribution-angle correction amount into the estimated subject distance using the pre-light emission dv_main. At the time of the direct light, dv_main_1=dv_main.

$dv$_main_1=$dv$_main−Light-distribution-angle correction amount　　　(13)

Next, in step ST53, the CPU 153 determines whether or not there is AF low contrast. In a case where there is AF low contrast, the CPU 153 proceeds to processing in step ST54. In this step ST54, the CPU 153 sets the final estimated subject distance dv_final for calculating the amount of main light emission as the estimated subject distance using the pre-light emission dv_main_1.

Next, the CPU 153 computes the amount of main light emission iv_main from the final estimated subject distance dv_final and the main-light-emission exposure control values in step ST55. In this case, in a case where the aperture at the time of the main light emission is assumed to be av_main and the sensitivity (gain control) at the time of the main light emission is assumed to be sv_main, the amount of main light emission iv_main is obtained by the following mathematical formula (14) and the flash appropriate guide number Gno. is obtained by the following mathematical formula (15).

$iv$_main=$dv$_final+$av$_main−$sv$_main+light-distribution-angle correction amount　　　(14)

Gno.=$^2$(($iv$_main+5)/2)　　　(15)

After the processing in step ST55, the CPU 153 ends the control processing in step ST56.

In a case where there is no AF low contrast in step ST53, the main-light-emission control type is selected on the basis of the bounce angle, the flash zoom position, and the photographing focal length in step ST102. Here, there are three main-light-emission control types: (1) use dv_lensNear and dv_lensFar; (2) use dv_lensNear only; and (3) not use dv_lensNear or dv_lensFar.

Here, the selection of the main-light-emission control type is further described. In the case of bouncing at an angle equal to or greater than a predetermined angle determined by the flash zoom position, no direct-light component exists in a lower part of the angle of view. In the case of bouncing at a further increased angle, the direct-light component completely deviates from the angle of view. Therefore, the correlation between the "light-emitting section of the flash-subject" distance and the amount of light emission does not hold true.

FIG. 25 illustrates an example of combinations for switching the main-light-emission control type according to the relationship between respective flash zoom positions and flash bounce angles. There are three different control types. The control type (1) is for a case where the light distribution angle is wide enough that light distribution reaches a lower part of the photographing angle of view even at the time of bouncing. The control type (1) is the same as the control at the time of no bouncing. The control type (3) is for a case where direct-light distribution does not enter the photographing angle of view at all. The control type (2) is for an intermediate area therebetween.

It is noted that although it is assumed in FIG. 25 that the photographing angle of view (photographing focal length) and the flash zoom position are linked, some flashes have a mode in the flashes' menu by which the flash zoom position is fixed regardless of the photographing focal length. In this case, although the combinations become different from the combinations in this table, the basic idea may only be as follows: select the control type (1) in a case where the photographing angle of view can be covered by the direct-light component; select the control type (3) in a case where light distribution is completely deviated; and select the control type (2) in the case of the intermediate condition that does not fall in either of the above conditions.

Returning to FIG. 24, after the processing in step ST102, the CPU 153 determines in step ST103 what the main-light-emission-amount control type is. In a case where the main-light-emission-amount control type is the control type (3), the CPU 153 sets the final estimated subject distance dv_final for calculating the amount of main light emission as dv_main_1 in step 54. Further, the CPU 153 computes the amount of main light emission iv_main from the final estimated subject distance dv_final and the main-light-emission exposure control values in step ST55. After that, the CPU 153 ends the control processing in step ST56.

In addition, in the case of the control type (1) in step ST103, the CPU 153 proceeds to processing in step ST71. In this step ST71, the CPU 153 determines whether or not dv_main_1 is within the range from the estimated far-side subject distance dv_lensFar to the estimated near-side subject distance dv_lensNear.

In a case where the CPU 153 determines that dv_main_1 is within the range, the CPU 153 sets the final estimated subject distance dv_final for calculating the amount of main light emission as dv_main_1 in step 54. Further, the CPU 153 computes the amount of main light emission iv_main from the final estimated subject distance dv_final and the main-light-emission exposure control values in step ST55. After that, the CPU 153 ends the control processing in step ST56.

In a case where the CPU 153 determines in step ST71 that dv_main_1 is not within the range, the CPU 153 proceeds to processing in step ST72. In this step ST72, the CPU 153 determines whether or not dv_main_1 is within the far range longer than dv_lensFar.

In a case where dv_main_1 >dv_lensFar is satisfied, the CPU 153 corrects the final estimated subject distance dv_final to the light-emission-amount suppression side by setting the final estimated subject distance dv_final as the estimated far-side subject distance dv_lensFar in step ST73 (see FIG. 13). On the other hand, in a case where dv_main_1 >dv_lensFar is not satisfied, the CPU 153 corrects the final estimated subject distance dv_final to the light-emission-amount increase side by setting the final estimated subject distance dv_final as the estimated near-side subject distance dv_lensNear in step ST74 (see FIG. 15).

After the processing in this step ST73 or ST74, the CPU 153 computes the amount of main light emission iv_main from the final estimated subject distance dv_final and the main-light-emission exposure control values in step ST55. After that, the CPU 153 ends the control processing in step ST56.

In addition, in the case of the control type (2) in step ST103, the CPU 153 proceeds to processing in step ST75. In this step ST75, the CPU 153 determines whether or not dv_main_1 is within the near range equal to or less than the estimated near-side subject distance dv_lensNear.

In a case where dv_main_1 <=dv_lensNear is not satisfied, the CPU 153 sets the final estimated subject distance dv_final for calculating the amount of main light emission as dv_main_1 in step 54. Further, the CPU 153 computes the amount of main light emission iv_main from the final estimated subject distance dv_final and the main-light-emission exposure control values in step ST55. After that, the CPU 153 ends the control processing in step ST56.

On the other hand, in a case where dv_main_1 <=dv_lensNear is satisfied in step ST75, the CPU 153 corrects the final estimated subject distance dv_final to the light-emission-amount increase side by setting the final estimated subject distance dv_final as the estimated near-side subject distance dv_lensNear in step ST74 (see FIG. 15). After the processing in this step ST74, the CPU 153 computes the amount of main light emission iv_main from the final estimated subject distance dv_final and the main-light-emission exposure control values in step ST55. After that, the CPU 153 ends the control processing in step ST56.

As described above, the processing of calculating the amount of main light emission illustrated in FIG. 24 uses the estimated subject distance using the pre-light emission dv_main corrected on the basis of the light-distribution-angle correction amount obtained according to the orientation of the external flash 171, that is, the bounce angle. Therefore, it is possible to obtain the final estimated subject distance dv_final more appropriately. This, as a result, makes it possible to increase the accuracy of adjusting the main light emission in a case where the light-emitting section does not face the subject.

In addition, it is conceivable that the processing of correcting the final estimated subject distance dv_final to the light-emission-amount increase side in the bounce state as in the above-described embodiment is not executed in a state where the external flash 171 is not fixed to the imaging apparatus 100 by the connection section 173, for example, in a state where the external flash 171 is connected to the imaging apparatus 100 by wire or wireless. This is because in this state, there is a possibility that the optical path of the external flash 171 becomes shorter than the estimated subject distance actually generated on the basis of the focus information, and in this case, the erroneous final estimated subject distance dv_final is obtained, and the accuracy of adjusting the main light emission is reduced as a result.

In addition, although the preferred embodiment of the present disclosure has been described above in detail with reference to the accompanying drawings, the technical scope of the present disclosure is not limited to the example. A person having ordinally skill in the technical field of the present disclosure can obviously conceive of various kinds of alterations and modifications within the scope of the technical ideas described in the appended claims, and it should be understood that they will naturally come within the technical scope of the present disclosure.

In addition, the processing procedures described in the above-described embodiment may be regarded as a method including the series of procedures, or may be regarded as a program for causing a computer to carry out the series of procedures or as a recording medium storing the program. A CD (Compact Disc), an MD (MiniDisc), a DVD (Digital Versatile Disk), a memory card, a Blu-ray Disc (registered trademark), or the like can be used as the recording medium, for example.

In addition, the present technology can also be configured as follows.

(1) An imaging apparatus including:
a control section configured to adjust, in a case of bounce light emission, an amount of main light emission on the basis of an estimated pre-light-emitted subject distance or information corresponding to the estimated pre-light-emitted subject distance and an estimated lens-focused subject distance, the estimated pre-light-emitted subject distance and the information corresponding to the estimated pre-light-emitted subject distance being obtained by pre-light-emission processing, the estimated lens-focused subject distance being obtained from focus information through a lens.

(2) The imaging apparatus according to (1), in which near-side lens error information is reflected in the estimated lens-focused subject distance.

(3) The imaging apparatus according to (1) or (2), in which in a case where the estimated pre-light-emitted subject distance is greater than the estimated lens-focused subject distance, the control section is configured to adjust the amount of main light emission for the case of the bounce light emission without using the estimated lens-focused subject distance.

(4) The imaging apparatus according to any one of (1) to (3), in which the control section is configured to obtain an estimated subject distance for adjusting the main light emission on the basis of the estimated pre-light-emitted subject distance or the information corresponding to the estimated pre-light-emitted subject distance and the estimated lens-focused subject distance and adjust the amount of main light emission on the basis of the estimated subject distance for adjusting the main light emission.

(5) The imaging apparatus according to (4), in which in a case where the estimated pre-light-emitted subject distance is smaller than the estimated lens-focused subject distance, the control section is configured to set, as the estimated subject distance for adjusting the main light emission, a distance made closer to the estimated lens-focused subject distance from the estimated pre-light-emitted subject distance by a predetermined amount.

(6) The imaging apparatus according to (5), in which the control section is configured to set the estimated lens-focused subject distance as the estimated subject distance for adjusting the main light emission.

(7) The imaging apparatus according to (5), in which in a case where the estimated pre-light-emitted subject distance is smaller than the estimated lens-focused subject distance by a certain amount or greater, the control section is configured to set, as the estimated subject distance for adjusting the main light emission, a distance increased from the estimated pre-light-emitted subject distance by up to the certain amount.

(8) The imaging apparatus according to (2), in which the control section is configured to acquire, from a lens apparatus, information regarding the estimated lens-focused subject distance in which the near-side lens error information is reflected.

(9) The imaging apparatus according to (2), in which the control section is configured to acquire the near-side lens error information from a lens apparatus and obtain information regarding the estimated lens-focused subject distance in which the near-side lens error information is reflected.

(10) The imaging apparatus according to (2), further including:
a holding section configured to hold the near-side lens error information,
in which the control section is configured to acquire the near-side lens error information from the holding section and obtain information regarding the estimated lens-focused subject distance in which the near-side lens error information is reflected.

(11) The imaging apparatus according to (10), further including:
a communication section configured to acquire the near-side lens error information from an external server and hold the near-side lens error information in the holding section.

(12) The imaging apparatus according to (10), further including:
a user operation section configured to input the near-side lens error information and hold the near-side lens error information in the holding section.

(13) The imaging apparatus according to any one of (1) to (12), in which in a state where a light-emitting section is fixed to a housing of the imaging apparatus, the control section is configured to adjust, in the case of the bounce light emission, the amount of main light emission on the basis of the estimated pre-light-emitted subject distance and the estimated lens-focused subject distance.

(14) The imaging apparatus according to any one of (1) to (13), in which the control section is configured to correct the estimated pre-light-emitted subject distance on the basis of information regarding an orientation of a light-emitting section.

(15) The imaging apparatus according to (14), in which the control section is configured to obtain a correction amount of the estimated pre-light-emitted subject distance on the basis of a light-emission attenuation rate corresponding to the information regarding the orientation of the light-emitting section.

(16) The imaging apparatus according to (15), in which the control section is configured to acquire, from the light-emitting section, information regarding the light-emission attenuation rate corresponding to the information regarding the orientation of the light-emitting section.

(17) The imaging apparatus according to (15), further including:
a holding section configured to hold the light-emission attenuation rate corresponding to the information regarding the orientation of the light-emitting section,
in which the control section is configured to acquire, from the holding section, information regarding the light-emission attenuation rate corresponding to the information regarding the orientation of the light-emitting section.

(18) A method for controlling an imaging apparatus, the method including:
adjusting, in a case of bounce light emission, an amount of main light emission on the basis of an estimated pre-light-emitted subject distance or information corresponding to the estimated pre-light-emitted subject distance and an estimated lens-focused subject distance, the estimated pre-light-emitted subject distance and the information corresponding to the estimated pre-light-emitted subject distance being obtained by pre-light-emission processing, the estimated lens-focused subject distance being obtained from focus information through a lens.

(19) A processing apparatus including:
a control section configured to adjust, in a case of bounce light emission, an amount of main light emission on the basis of an estimated pre-light-emitted subject distance or information corresponding to the estimated pre-light-emitted subject distance and an estimated lens-focused subject distance, the estimated pre-light-emitted subject distance and the information corresponding to the estimated pre-light-emitted subject distance being obtained by pre-light-emission processing, the estimated lens-focused subject distance being obtained from focus information through a lens.

(20) An imaging apparatus including:
a control section configured to control
processing of obtaining an estimated pre-light-emitted subject distance obtained by pre-light-emission processing,
processing of obtaining an estimated near-side subject distance in which near-side lens error information is reflected and an estimated near-side subject distance in which far-side lens error information is reflected, the estimated near-side subject distances being obtained from focus information through a lens,
processing of correcting the estimated pre-light-emitted subject distance on the basis of information regarding an orientation of a light-emitting section, and
processing of adjusting an amount of main light emission on the basis of the estimated pre-light-emitted subject distance corrected, the estimated near-side subject distance, and an estimated far-side subject distance.

REFERENCE SIGNS LIST

10 . . . Imaging system
100 . . . Imaging apparatus
101 . . . Bus
111 . . . Shutter
112 . . . Shutter control section
113 . . . Imaging element
114 . . . Imaging control section
121 . . . Operation section
122 . . . Operation control section
131 . . . Display section
132 . . . Display control section
141 . . . Memory
142 . . . Memory control section
151 . . . ROM
152 . . . RAM
153 . . . CPU
161 . . . Communication section
162 . . . Photometry section
163 . . . Distance measurement section
171 . . . External flash
172 . . . Light-emission control section
173 . . . Connection section
200 . . . Interchangeable lens
211 . . . Lens section
212 . . . Aperture
220 . . . Interchangeable-lens control section
221 . . . Communication section

The invention claimed is:

1. An imaging apparatus, comprising:
a control section configured to:
obtain each of an estimated pre-light-emitted subject distance and information corresponding to the estimated pre-light-emitted subject distance based on a pre-light-emission process;
obtain an estimated lens-focused subject distance from focus information through a lens, wherein the estimated lens-focused subject distance includes near-side lens error information; and
adjust an amount of main light emission based on at least one of the estimated pre-light-emitted subject distance or the information corresponding to the estimated pre-light-emitted subject distance and the estimated lens-focused subject distance in bounce light emission.

2. The imaging apparatus according to claim 1, wherein the control section is further configured to adjust, based on the estimated pre-light emitted subject distance is greater than the estimated lens-focused subject distance, the amount of the main light emission without the estimated lens-focused subject distance.

3. The imaging apparatus according to claim 1, wherein the control section is further configured to:
obtain an estimated subject distance;
adjust the main light emission based on at least one of the estimated pre-light-emitted subject distance or the information corresponding to the estimated pre-light-emitted subject distance, and the estimated lens-focused subject distance; and
adjust the amount of main light emission based on the estimated subject distance.

4. The imaging apparatus according to claim 3, wherein the control section is further configured to set, based on the estimated pre-light emitted subject distance is smaller than the estimated lens focused subject distance, a first distance closer to the estimated lens-focused subject distance from the estimated pre-light-emitted subject distance by a first amount, and
the first distance is set as the estimated subject distance.

5. The imaging apparatus according to claim 4, wherein the control section is further configured to set the estimated lens-focused subject distance as the estimated subject distance.

6. The imaging apparatus according to claim 4, wherein the control section is further configured to:
set, based on the estimated pre-light-emitted subject distance is smaller than the estimated lens-focused subject distance by greater than or equal to a second amount, a second distance increased from the estimated pre-light-emitted subject as the estimated subject distance; and
adjust the main light emission based on the set distance.

7. The imaging apparatus according to claim 1, wherein the control section is further configured to acquire, from a lens apparatus, information related to the estimated lens-focused subject distance that includes the near-side lens error information.

8. The imaging apparatus according to claim 1, wherein the control section is further configured to:
acquire the near-side lens error information from a lens apparatus; and
obtain information related to the estimated lens-focused subject distance that includes the near-side lens error information.

9. The imaging apparatus according to claim 1, further comprises:

a holding section configured to hold the near-side lens error information, wherein the control section is further configured to:
  acquire the near-side lens error information from the holding section; and
  obtain information related to the estimated lens-focused subject distance that includes the near-side lens error information.

10. The imaging apparatus according to claim 9, further comprising:
  a communication section configured to acquire the near-side lens error information from an external server.

11. The imaging apparatus according to claim 9, further comprises
  a user operation section configured to input the near-side lens error information to the control section.

12. The imaging apparatus according to claim 1, wherein in a state where a light-emitting section is fixed to a housing of the imaging apparatus, the control section is further configured to adjust the amount of main light emission based on the estimated pre-light-emitted subject distance and the estimated lens-focused subject distance.

13. The imaging apparatus according to claim 1, wherein the control section is further configured to correct the estimated pre-light-emitted subject distance based on information related to an orientation of a light-emitting section.

14. The imaging apparatus according to claim 13, wherein the control section is further configured to obtain a correction amount of the estimated pre-light-emitted subject distance based on a light-emission attenuation rate corresponding to the information related to the orientation of the light-emitting section.

15. The imaging apparatus according to claim 14, wherein the control section is further configured to acquire information related to the light-emission attenuation rate from the light-emitting section, and
  the information related to the light-emission attenuation rate corresponds to the information related to the orientation of the light-emitting section.

16. The imaging apparatus according to claim 14, further comprises
  a holding section configured to hold the information related to the light-emission attenuation rate corresponding to the information related to the orientation of the light-emitting section, wherein the control section is further configured to acquire information related to the light-emission attenuation rate from the holding section.

17. A method for controlling an imaging apparatus, the method comprising:
  obtaining an estimated pre-light-emitted subject distance and information corresponding to the estimated pre-light-emitted subject distance based on pre-light-emission processing;
  obtaining an estimated lens-focused subject distance from focus information through a lens, wherein the estimated lens-focused subject distance includes near-side lens error information; and
  adjusting an amount of main light emission based on at least one of the estimated pre-light-emitted subject distance or the information corresponding to the estimated pre-light-emitted subject distance and the estimated lens-focused subject distance in bounce light emission.

18. A processing apparatus, comprising:
a control section configured to:
  obtain an estimated pre-light-emitted subject distance and information corresponding to the estimated pre-light-emitted subject distance based on a pre-light-emission process;
  obtain an estimated lens-focused subject distance from focus information through a lens, wherein the estimated lens-focused subject distance includes near-side lens error information; and
  adjust an amount of main light emission based on at least one of the estimated pre-light-emitted subject distance or the information corresponding to the estimated pre-light-emitted subject distance and the estimated lens-focused subject distance in bounce light emission.

19. An imaging apparatus, comprising:
a control section configured to:
  obtain an estimated pre-light-emitted subject distance by a pre-light-emission process;
  obtain an estimated near-side subject distance from focus information through a lens, wherein estimated near-side subject distance includes near-side lens error information and far-side lens error information;
  correct the estimated pre-light-emitted subject distance based on information related to an orientation of a light-emitting section; and
  adjust an amount of main light emission based on the estimated near-side subject distance, an estimated far-side subject distance, and the correction of the estimated pre-light-emitted subject distance.

* * * * *